US011314389B2

(12) United States Patent
You et al.

(10) Patent No.: US 11,314,389 B2
(45) Date of Patent: Apr. 26, 2022

(54) METHOD FOR PRESENTING CONTENT BASED ON CHECKING OF PASSENGER EQUIPMENT AND DISTRACTION

(71) Applicant: Samsung Electronics Co., Ltd, Suwon-si (KR)

(72) Inventors: Juyeon You, Suwon-si (KR); Yongjun Lim, Suwon-si (KR); Donghee Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/230,537

(22) Filed: Dec. 21, 2018

(65) Prior Publication Data

US 2019/0196679 A1    Jun. 27, 2019

(30) Foreign Application Priority Data

Dec. 22, 2017    (KR) .......................... 10-2017-0178780

(51) Int. Cl.
*G06F 3/0484* (2022.01)
*G06F 3/04817* (2022.01)
(Continued)

(52) U.S. Cl.
CPC ............ *G06F 3/0484* (2013.01); *B60K 35/00* (2013.01); *B60K 37/02* (2013.01);
(Continued)

(58) Field of Classification Search
CPC .. G06F 3/0484; G06F 3/1423; G06F 3/04817; G06F 3/1454; B60K 37/02;
(Continued)

(56) References Cited

U.S. PATENT DOCUMENTS

| 2013/0030645 A1* | 1/2013 | Divine | ................... | B60K 35/00 |
| | | | | 701/36 |
| 2014/0106726 A1* | 4/2014 | Crosbie | ................. | B60W 50/14 |
| | | | | 455/418 |

(Continued)

FOREIGN PATENT DOCUMENTS

| KR | 10-2016-0088718 A | 7/2016 |
| KR | 10-1698514 B1 | 1/2017 |

(Continued)

OTHER PUBLICATIONS

European Patent Office, "European Search Report," Application No. EP18215511.9, dated May 9, 2019, 9 pages.

(Continued)

*Primary Examiner* — Cesar B Paula
*Assistant Examiner* — Zelalem "Zee" Shalu

(57) ABSTRACT

A vehicular electronic device includes a first communication circuit; a second communication circuit, a first display corresponding to a driver-seat and a second display corresponding to a non-driver seat, and a processor, wherein the processor is configured, upon receiving content via the first communication circuit, to determine a display to present the received content among the first display or the second display, upon determination that the first display is to present the received content, to determine, based on vehicle information received from the second communication circuit, whether a user is in a driving mode, upon determination that the user is in the driving mode, to identify a type of the received content, when the received content is of a first type, to present the received content on the first display, and when the received content is of a second type, not to present the received content on the first display.

7 Claims, 16 Drawing Sheets

(51) Int. Cl.
  *G06F 3/14* (2006.01)
  *B60K 37/02* (2006.01)
  *B60K 35/00* (2006.01)

(52) U.S. Cl.
  CPC ........ *G06F 3/04817* (2013.01); *G06F 3/1423* (2013.01); *B60K 2370/152* (2019.05); *B60K 2370/182* (2019.05); *B60K 2370/186* (2019.05); *B60K 2370/195* (2019.05); *G06F 3/1454* (2013.01); *G09G 2380/10* (2013.01)

(58) Field of Classification Search
  CPC ............. B60K 35/00; B60K 2370/186; B60K 2370/195; B60K 2370/152; B60K 2370/182; G09G 2380/10
  See application file for complete search history.

(56) References Cited

U.S. PATENT DOCUMENTS

| | | | | |
|---|---|---|---|---|
| 2014/0163774 A1* | 6/2014 | Demeniuk | ............. | H04L 67/12 |
| | | | | 701/2 |
| 2016/0159218 A1 | 6/2016 | Kang | | |
| 2016/0169685 A1 | 6/2016 | Heo | | |
| 2016/0212536 A1 | 7/2016 | Park et al. | | |
| 2016/0248905 A1* | 8/2016 | Miller | ............... | H04M 1/72577 |
| 2017/0185362 A1 | 6/2017 | Cansino et al. | | |
| 2017/0196029 A1 | 7/2017 | Geerlings et al. | | |
| 2017/0364148 A1 | 12/2017 | Kim | | |
| 2018/0060253 A1* | 3/2018 | Gao | ........................ | B60K 35/00 |
| 2018/0181360 A1* | 6/2018 | Cansino | ........... | H04N 21/43076 |
| 2018/0357040 A1* | 12/2018 | Spiewla | .................. | G06F 3/012 |
| 2019/0070959 A1 | 3/2019 | Hamasaki et al. | | |
| 2019/0087148 A1* | 3/2019 | Goel | .................. | G06K 9/00791 |
| 2019/0092169 A1* | 3/2019 | Thurimella | ............ | B60K 35/00 |

FOREIGN PATENT DOCUMENTS

| | | |
|---|---|---|
| WO | 2017068759 A1 | 4/2017 |
| WO | 2017081871 A1 | 5/2017 |

OTHER PUBLICATIONS

Communication pursuant to Article 94(3) EPC dated Feb. 2, 2021 in connection with European Application No. 18215511.9, 10 pages.

* cited by examiner

| DRIVING STATUS / SEATED SCENARIO | | DRIVING MODE | NON-DRIVING MODE |
|---|---|---|---|
| FIRST SCENARIO (DRIVER SEAT LOCATION) | DRIVER SEAT DISPLAY | PRESENT FIRST TYPE CONTENT (RECEPTION VIA DRIVING-RELATED APP) | PRESENT FIRST TYPE AND SECOND TYPE CONTENTS PRESENT FOURTH TYPE CONTENT |
| | FRONT NON-DRIVER SEAT DISPLAY | DISPLAY THIRD TYPE CONTENT (RECEPTION VIA DRIVING-RELATED APP OR DRIVING-RELATED AUXILIARY APP) | PRESENT FIRST TYPE TO THIRD TYPE CONTENTS |
| | REAR SEAT DISPLAY | PRESENT FIRST TYPE AND SECOND TYPE CONTENTS | |
| SECOND SCENARIO (FRONT NON-DRIVER SEAT LOCATION) | DRIVER SEAT DISPLAY | PRESENT FIRST TYPE CONTENT | PRESENT FIRST TYPE AND SECOND TYPE CONTENTS |
| | FRONT NON-DRIVER SEAT DISPLAY | DISPLAY THIRD TYPE CONTENT | PRESENT FIRST TYPE TO FOURTH TYPE CONTENTS |
| THIRD SCENARIO (REAR SEAT LOCATION) | DRIVER SEAT DISPLAY | PRESENT FIRST TYPE CONTENT | PRESENT FIRST TYPE AND SECOND TYPE CONTENTS |
| | REAR SEAT DISPLAY | PRESENT FIRST TYPE AND SECOND TYPE CONTENTS | PRESENT FIRST TYPE TO FOURTH TYPE CONTENTS |

FIG. 8

METHOD FOR PRESENTING CONTENT BASED ON CHECKING OF PASSENGER EQUIPMENT AND DISTRACTION

CROSS-REFERENCE TO RELATED APPLICATIONS

This application is based on and claims priority under 35 U.S.C. § 119 to Korean Patent Application No. 10-2017-0178780 filed on Dec. 22, 2017, in the Korean Intellectual Property Office, the disclosure of which is incorporated by reference herein its entirety.

BACKGROUND

1. Field

The present disclosure relates to vehicle content presentation techniques.

2. Description of Related Art

While a conventional vehicle system has a very small display, a recent vehicle system has a tendency to have a larger display. Thus, the vehicle system may provide infotainment services such as displaying more information on the display, or outputting a graphical user interface.

The in-vehicle infotainment system further includes a passenger display (e.g., a display for a front non-driver seat or a display for a rear seat) in addition to a display corresponding to the driver-seat (e.g., a cluster panel, middle display). The system can also provide infotainment services to the passengers as well.

The in-vehicle infotainment system may also support a screen mirroring service between the display and the screen of the smartphone so that the user in the vehicle may utilize the functionality of the smartphone on a larger screen display.

The above information is presented as background information only to assist with an understanding of the present disclosure. No determination has been made, and no assertion is made, as to whether any of the above might be applicable as prior art with regard to the present disclosure.

SUMMARY

When the in-vehicle infotainment system is displaying content on the driver display, an application installed by default in the vehicle infotainment system may allow the content to be displayed according to a specified guide to less distract the driver's view. The specified guide may, for example, include a guide for a font size, a content amount, a depth, and so on. However, downloaded content or content on the screen-mirrored screen may not comply with the specified guide. This may also distribute the driver's field of view.

Aspects of the present disclosure are to address at least the above-mentioned problems and/or disadvantages and to provide at least the advantages described below. Accordingly, an aspect of the present disclosure is to provide a vehicular electronic device and a content presentation method thereof by which the content displayed on the vehicle display may reduce the degree of interference with the driver's view during driving.

In accordance with an aspect of the present disclosure, a vehicular electronic device includes a first communication circuit that receives content, a second communication circuit that receives vehicle information; a first display corresponding to a driver-seat and a second display corresponding to a non-driver seat, and a processor operatively connected to the first display, the second display, the first communication circuit, and the second communication circuit, wherein the processor is configured: upon receiving the content via the first communication circuit, to determine a display to present the received content from among the first display or the second display, upon determination that the first display is to present the received content, to determine, based on the received vehicle information from the second communication circuit, whether a user is in a driving mode, upon determination that the user is in the driving mode, to identify a type of the received content; when the received content is of a first type, to present the received content on the first display, and when the received content is of a second type, not to present the received content on the first display.

In accordance with another aspect of the present disclosure, the content presentation method by a vehicular electronic device includes receiving content, determining a display to present the received content from among a first display or a second display, wherein the first display corresponds to a driver-seat and the second display corresponds to a non-driver seat, and upon determination that the first display is to present the received content, determining, based on vehicle information, whether a user is in a driving mode, upon determination that the user is in the driving mode, identifying a type of the received content, when the received content is of a first type, allowing presentation of the received content on the first display, and when the received content is of a second type, disallowing presentation of the received content on the first display.

According to the embodiments disclosed in the present disclosure, the extent to which the view field of the driver during the drive is disturbed by the content presentation may be reduced. In addition, the present disclosure may provide various effects that are directly or indirectly grasped.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 shows an example of content displayed for each display based on a driver's location change according to one embodiment;

In the description of the drawings, the same or similar reference numerals may be used to indicate the same or similar components.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
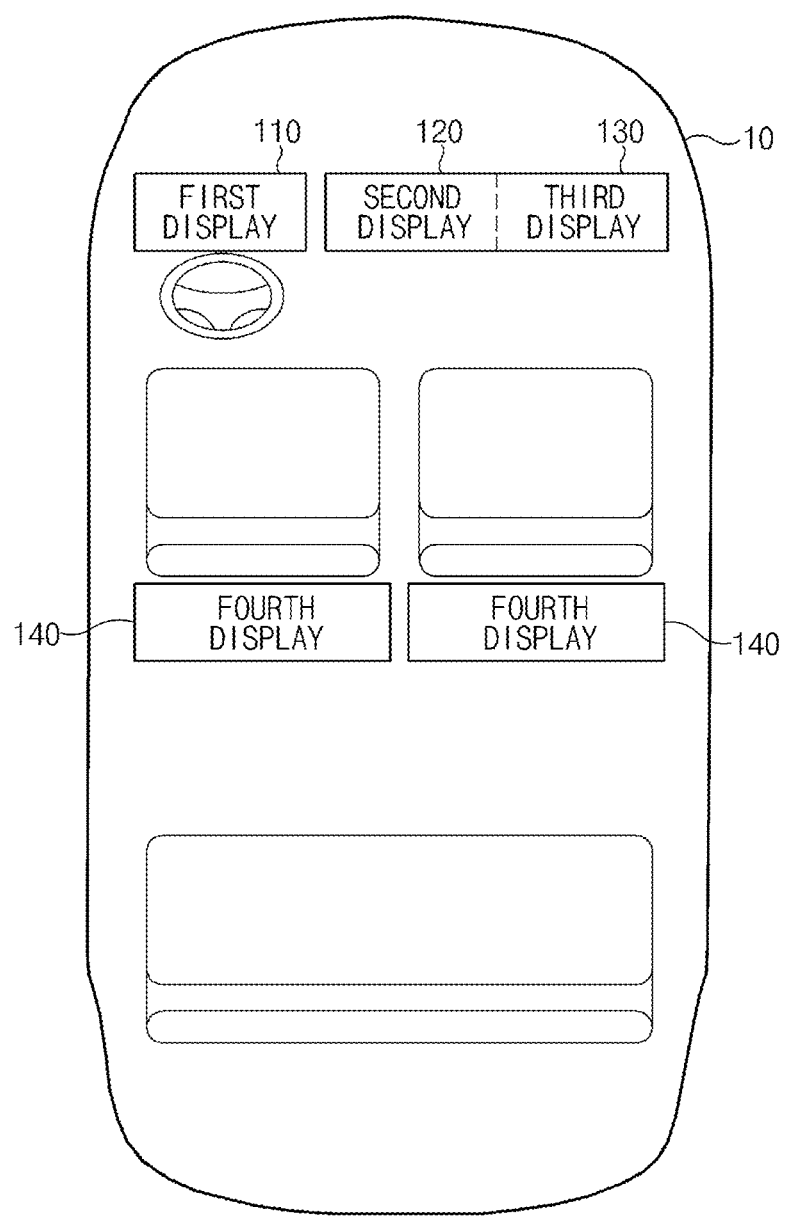
FIG. 1 shows an arrangement of multiple displays of a vehicular electronic device according to one embodiment.

FIG. 1 shows an arrangement of multiple displays of the vehicular electronic device according to one embodiment.

Referring to FIG. 1, according to one embodiment, a vehicular electronic device 10 may include a plurality of displays 110, 120, 130 and 140. The vehicular electronic device 10 may include, for example, an in-vehicle infotainment system, an entertainment system, or an air conditioner control system. The vehicular electronic device according to the embodiment of the present disclosure is not limited to the device s described above.

According to one embodiment, the plurality of displays 110, 120, 130 and 140 may include, for example, the first display 110, the second display 120, the third display 130 and the plurality of fourth displays 140. The first display 110 may be, for example, a cluster display. The second display 120 may be, for example, a middle display or a head unit display. The third display 130 may be, for example, a front non-driver seat display. The plurality of fourth displays 140 may be rear-seat displays. In one embodiment, some components may be omitted, or additional components may be included. For example, although in FIG. 1, the fourth displays 140 are provided on the rear-seats of the vehicle as an example, only a single display may be provided on the vehicle rear-seats. In one embodiment, some of the components are combined together to form one entity. In this connection, functions of the corresponding components prior to the combination may be performed in the same manner after the combination.

According to one embodiment, the vehicular electronic device 10 may output content as stored by default in its own memory, or content received from an external device on at least one of the plurality of displays 110, 120, 130 and 140. The external device may be, for example, a content server or a user equipment.

Figure 2:
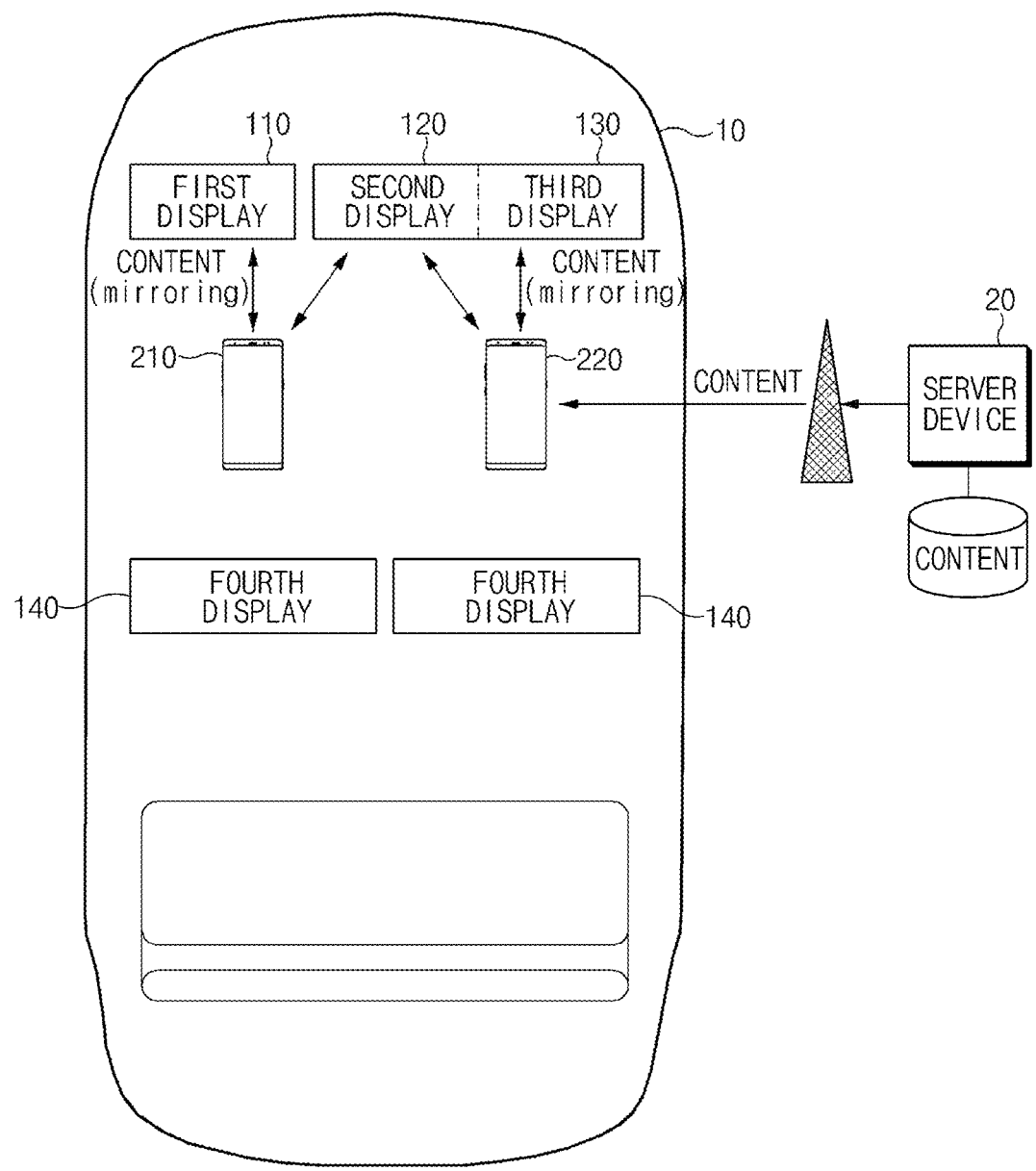
FIG. 2 shows a content reception interface between the vehicular electronic device and user equipment according to one embodiment.

FIG. 2 shows a content reception interface between the vehicular electronic device and the user equipment according to one embodiment.

Referring to FIG. 2, according to one embodiment, the user equipment 210 or 220 may receive content from the server device 20 via a base station. The user equipment 210 or 220 may also request the vehicular electronic device 10 to perform a screen mirroring function or a mirror link function. The user equipment 210 or 220 may include, for example, at least one of a portable communication device (e.g., a smart phone), a portable multimedia device, a portable medical device, a camera, or a wearable device. The user equipment 210 or 220 according to an embodiment of the present disclosure is not limited to the devices described above. According to various embodiments, the user equipment 210 or 220 may receive content from the server device 20 via a communication module (e.g., an AP access point)) within the vehicle.

According to one embodiment, the vehicular electronic device 10 may communicate with the first user equipment 210 and the second user equipment 220 to determine a location of each of the first user equipment 210 and the second user equipment 220 in the vehicle. The vehicular electronic device 10 may determine a display corresponding to each user equipment 210 or 220 among the plurality of displays 110, 120, 130 and 140 based on the determined location of each user equipment 210 or 220. For example, the display corresponding to the first user equipment 210 located relatively closer to the driver-seat may be the driver-seat display, for example, at least one display of the first display 110 or the second display 120. In another example, a display corresponding to second user equipment 220 located on the front non-driver seat may include the third display 130. According to various embodiments, the display corresponding to the second user equipment 220 may also include the second display 120. Each display corresponding to each user equipment may include a display to present content received (e.g., screen-mirrored) from each user equipment.

According to one embodiment, the vehicular electronic device 10 may or may not present the received content according to the type of the content in the user's driving mode. The user's driving mode includes, for example, a gear R mode or D mode. The driving mode may include a case where the vehicle speed is equal to or higher than a designated speed (e.g., 5 km/h). The type of the content may include a first type and second type. The first type content may include at least one of driving-related content, text content, or still image content. The driving-related content may, for example, include content for a route guidance service. The text content may be content that contains text, numbers, special symbols. For example, the text content may include personal information (for example, driver name and the like), receiver information (for example, CID; caller ID) according to a handsfree function, and the like. The still image content may also include still image content such as, for example, photographs, pictures, or menu icons. The second type content may, for example, include moving picture content, game content, or content including information about depth of at least three dimensions.

According to one embodiment, when the type of content received from the first user equipment 210 located on the driver-seat is the first type, the vehicular electronic device 10 may present content on the display corresponding to the driver-seat (for example, 120), regardless of whether the user is driving or not. According to various embodiments, the vehicular electronic device 10 may convert the received content in a driving mode of the user and present the converted content on the display corresponding to the driver-seat (for example, 120).

According to one embodiment, when the type of the received content is of the second type, the vehicular electronic device 10 does not present the received content onto the display corresponding to the driver-seat (for example, 120) in the user's driving mode. In the non-driving mode of the user, the vehicular electronic device 10 may present the received content onto the display corresponding to the driver-seat (for example, 120). The non-driving mode of the user may include, for example, a gear neutral mode (hereinafter, referred to as "N mode") or a parking mode (hereinafter, referred to as "P mode"), or may include autonomous driving mode.

According to one embodiment, the vehicular electronic device 10 may present the content received from the second user equipment 220 disposed on the front non-driver seat on the third display 130 corresponding to the front non-driver seat. The vehicular electronic device 10 may further present the content received from the second user equipment 220 on the display corresponding to the driver-seat (for example, 120), according to a user request via the input device. In this case, the vehicular electronic device 10 identifies the type of the received content, when the received content is the second type, the vehicular electronic device 10 does not present the content on the display corresponding to the driver-seat (for example, 120) in the driving mode. In the non-driving mode, the vehicular electronic device 10 may present the content on the display corresponding to the driver-seat (for example, 120). For example, when the content type is the second type, the vehicular electronic device 10 presents the content only on the third display 130 in the user's driving mode. The vehicular electronic device 10 may present the content on the second display 120 and the third display 130 in the non-driving mode of the driver. To the contrary, when the received content type is the first type, the vehicular electronic device 10 may present the content on the second display 120 regardless of whether the user is driving or not.

Figure 3:
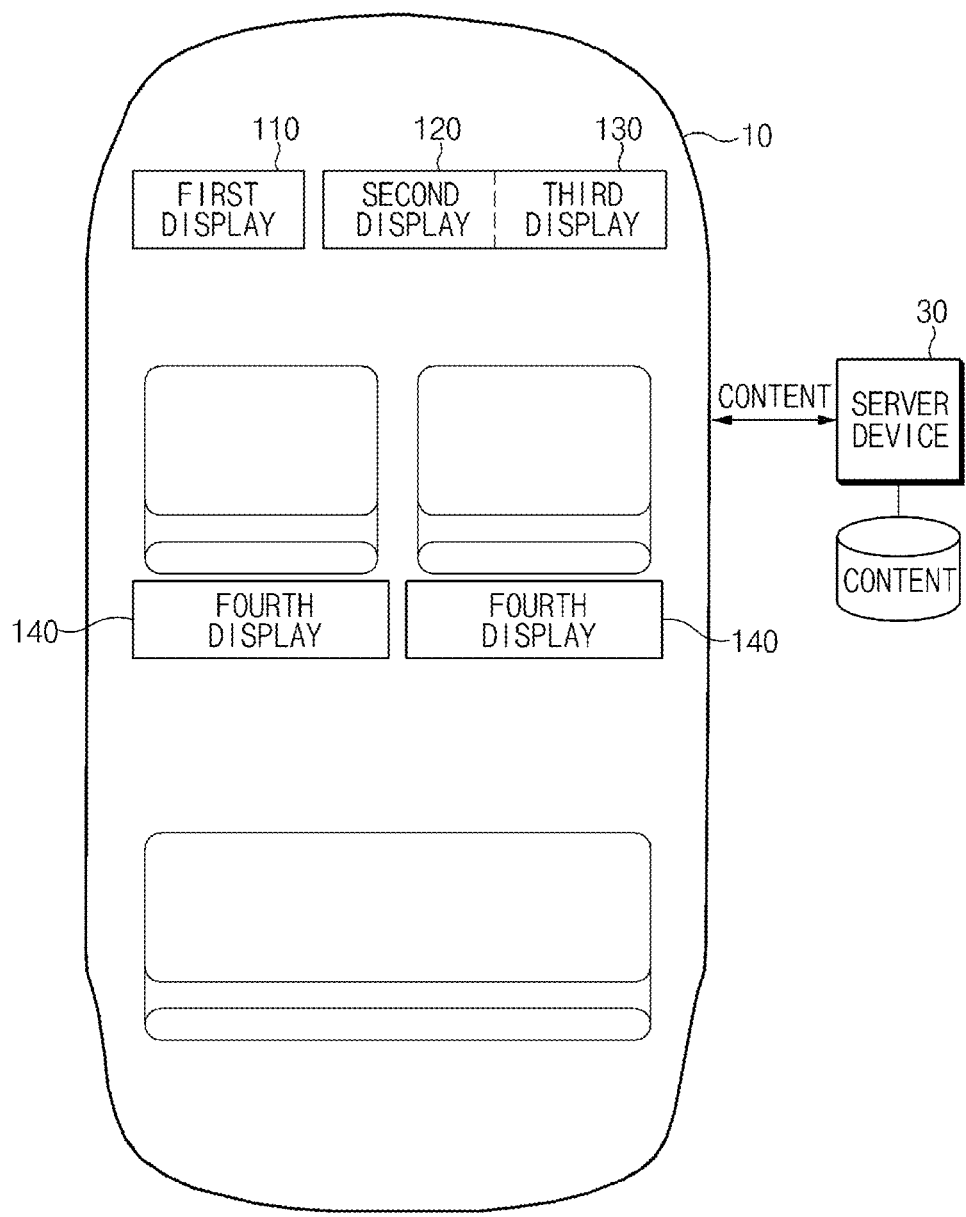
FIG. 3 shows a content reception interface between the vehicular electronic device and a server device according to one embodiment.

FIG. 3 shows a content reception interface between the vehicular electronic device and the server device according to one embodiment.

Referring to FIG. 3, according to one embodiment, the vehicular electronic device 10 may receive content from the server device 30 via its own communication circuit, in response to a user request from an input device (for example, a touch screen). When the vehicular electronic device 10 receives the content, the vehicular electronic device 10 may determine a display corresponding to the received content. For example, the vehicular electronic device 10 may determine a display that is relatively closer to the location of the driver or passenger on the vehicle as a display corresponding to the received content. For example, the vehicular electronic device 10 may identify the locations of the driver and passenger using an image sensor that captures the passenger's face corresponding to each seat or at least one seat sensor that detects a weight of each passenger on each seat.

When the determined display is a display corresponding to the driver-seat, the vehicular electronic device 10 may be configured to check, based on vehicle information, whether the vehicle is in a driving mode of a user (for example, driver). In this connection, the vehicular electronic device 10 may or may not present the received content in the driving mode of the user. For example, in the driving mode of the user, the vehicular electronic device 10 identifies the type of the received content. When the received content is a first type, the vehicular electronic device 10 may also present the received content on the display corresponding to the driver-seat (for example, 120) in the user's driving mode. In another example, the vehicular electronic device 10 identifies the type of the received content in the user's driving mode. When the type of the received content is the second type, the vehicular electronic device 10 does not present the received content on the display corresponding to the driver-seat (for example, 120) in a user's driving mode. The vehicular electronic device 10 may present the received content on a display corresponding to the driver-seat (for example, 120) in the non-driving mode of the user.

When the determined display is a display corresponding to a front non-driver seat, the vehicular electronic device 10 may present the received content on the third display 130 corresponding to the front non-driver seat. The vehicular electronic device 10 may further present the received content to the display (for example, 120) corresponding to the driver-seat, in response to a user request via the input device. In this case, when the received content belongs to the second type, the vehicular electronic device 10 does not present the content on the display (for example, 120) corresponding to the driver-seat in the driving mode. In the non-driving mode, the vehicular electronic device 10 may present the content on the display (for example, 120) corresponding to the driver-seat. For example, when the content type is the second type, the vehicular electronic device 10 may present the received content only on the third display 130 in the user's driving mode. The vehicular electronic device 10 may present the received content on the second display 120 and the third display 130 in a non-driving mode of the driver. To the contrary, when the type of the received content is the first type, the vehicular electronic device 10 may present the content on the second display 120 regardless of whether the user is in the driving mode or non-driving mode.

According to the above-described embodiment, when the vehicular electronic device 10 presents the content on the plurality of displays, the degree of interference with the user's driving view field by the content presentation may be reduced.

Figure 4:
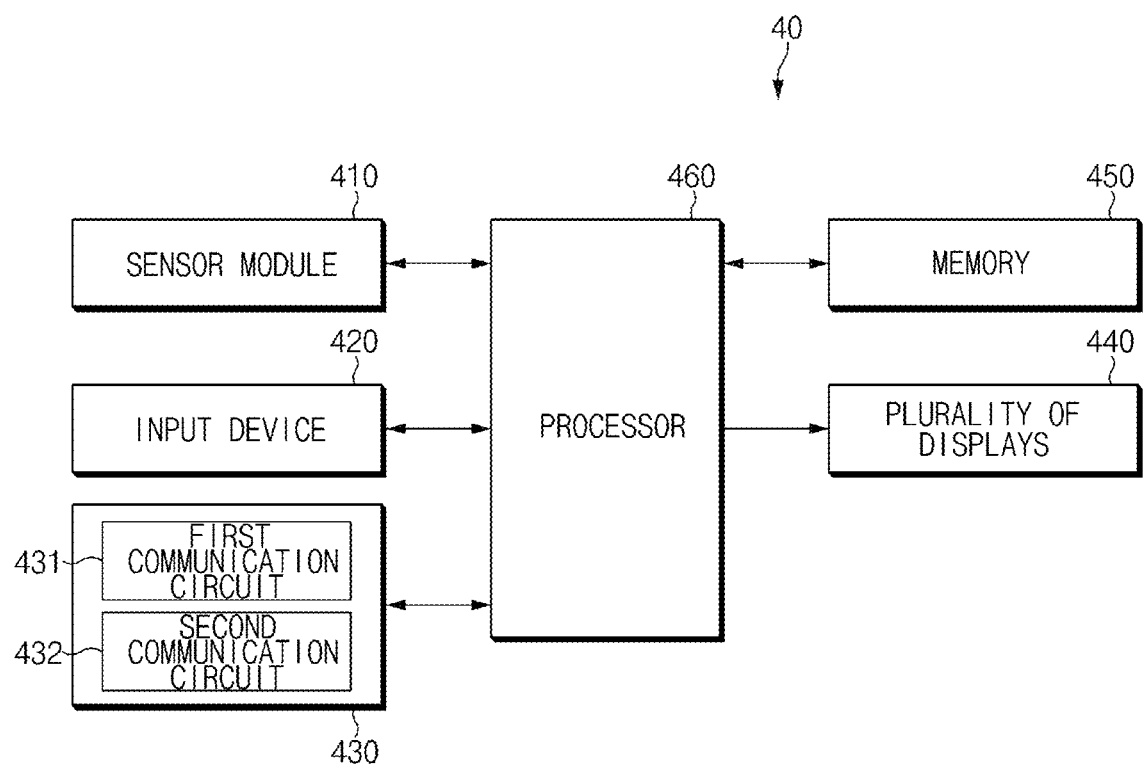
FIG. 4 shows a configuration of the vehicular electronic device according to one embodiment.

FIG. 4 shows a configuration of the vehicular electronic device according to one embodiment.

Referring to FIG. 4, according to one embodiment, a vehicular electronic device 40 may include a sensor module 410, an input device 420, a communication module 430, a plurality of displays 440, a memory 450, and a processor 460. In one embodiment, some components may be omitted or additional components may be further included. In one embodiment, some of the components are combined into one entity. In this case, the functions of the corresponding components before the combination may also be performed in the same manner after the combination. An input/output relationship as shown in FIG. 4 is only an example for convenience of explanation. The present disclosure may not be limited thereto.

According to one embodiment, the sensor module 410 may include at least one sensor. At least one sensor may include, for example, at least one of a lidar, a radar, an ultrasonic sensor, an image sensor, or a camera, a seat sensor, or a door sensor. The lidar, radar, ultrasound sensor, or external image sensor may sense a user or obstacle proximate to the vehicle, according to the commands from the processor 460. The image sensor in the vehicle may capture a user who rides on each seat of the vehicle according to the commands from the processor 460. The seat sensor may sense a weight of the passenger on each seat according to the commands from the processor 460. The door sensor, for example, may sense the opening and closing of the door according to a command from the processor 460.

According to one embodiment, the input device 420 may receive or sense user input. The input device 420 may include at least one of a touch sensor or a physical button disposed in each display 440.

According to one embodiment, the communication module 430 may include a first communication circuit 431 configured to receive content and a second communication circuit 432 configured to receive vehicle information. The first communication circuit 431 may communicate using at least one communication protocol of, for example, NFC, Bluetooth, WiFi, 4G or 5G. The first communication circuit 431 may receive content from, for example, the user equipment 510, or may receive content from the server device 20. The second communication circuit 432 may communicate with other devices in the vehicle over a vehicle network (e.g., CAN, MOST). The vehicle information may include at least one of a gear mode, vehicle speed, or a vehicle driving or non-driving mode.

Each of the plurality of displays 440 may display, for example, various contents (for example, text, image, video, icon, and/or symbol). Each of the displays 440 may include, for example, a liquid crystal display (LCD), a light emitting diode (LED) display, and an organic light emitting diode (OLED) display. The plurality of displays 440 may include a display associated with the driver-seat (for example, at least one of the first display 110 or second display 120 of FIG. 1, hereinafter, referred to as a display corresponding to a driver-seat), and a display associated with a non-driver seat (for example, at least one of the third display 130 or the fourth display 140 of FIG. 1, hereinafter referred to as a display corresponding to a non-driver seat). The display corresponding to the driver-seat may include at least one of the cluster display or the middle display (for example, head unit display). The display corresponding to the non-driver seat may include at least one of the display corresponding to the front non-driver seat or the displays corresponding to the rear seats.

According to one embodiment, the memory 450 may store commands or data related to at least one another component of the vehicular electronic device 40, for example. For example, the memory 450 may store instructions for determining a display among the plurality of displays 440 to present the received content, based on the location of the user. In another example, the memory 450 may store instructions for determining the type of content received. In still another example, the memory 450 may store instructions for determining whether to present the content based on at least one of the location of the user, the type of the received content, and the driving mode of the user. In still another example, the memory 450 may store instructions for converting the received content (first type content) according to a specified standard. The memory 450 may be a volatile memory (e.g., RAM, etc.), a non-volatile memory (e.g., ROM, flash memory, etc.), or a combination thereof.

According to one embodiment, the processor 460 may perform operations or data processing related to the control and/or communication of the at least one another component of the vehicular electronic device 40 using instructions stored in the memory 450. For example, when the processor 460 receives content via the first communication circuit 431, the processor may determine, among the plurality of displays 440, a display for presenting the received content. When the determined display includes a display corresponding to the driver-seat (for example, at least one of displays 110 and 120 in FIG. 1, and hereinafter referred to as a first display), the processor 460 receives the vehicle information via the second communication circuit 432. Then, the processor may determine whether the user is in a driving mode based on the vehicle information. When the user is in the driving mode, the processor 460 identifies the type of the received content. When the received content is of the first type, the processor 460 may present the received content on the display corresponding to the driver-seat. When the received content is of the second type, the processor 460 may not present the received content on the display corresponding to the driver-seat. The processor 460 may include at least one of a central processing unit (CPU), a graphics processing device (GPU), a microprocessor, an application processor, an application specific integrated circuit (ASIC), and an FPGA (field programmable gate array), and may have a plurality of cores.

According to one embodiment, the processor 460 may receive content from the user equipment 510 or the server device 20 via the first communication circuit 431. For example, when a screen mirroring function with the user equipment 510 is requested, the processor 460 receives content from the user equipment 510 in response to the request. The processor 460 may present the received content on a display, for example, on a display corresponding to a user's location (or a location of the user equipment). As another example, when a user requests content download by manipulating the input device 420, the processor 460 requests the content toward the server device 20. The processor 460 may receive the content from the server device in a response to the request. As another example, when, with the processor 460 being mirror-linked to the user equipment 510, a user requests content download via the input device 420, the processor 460 requests the server device of the content via the user equipment 510. Then, the processor 460 may receive the content from the server device 20.

According to one embodiment, when the processor 460 receives content, the processor 460 may determine a display for presenting the received content (hereinafter, referred to as a display corresponding to the received content). For example, the processor 460 senses a user location via the sensor module. Then, the processor may determine, among the plurality of displays 440, a display that is relatively closer to the sensed user location as the display corresponding to the received content. In another example, the processor 460 may locate the user equipment via the communication module 430. Then, the processor 460 may determine, among the plurality of displays 440, a display that is relatively closer to the identified location of the user equipment as the display corresponding to the received content. According to various embodiments, the processor 460 may present one received content on two or more displays. For example, the processor 460 may present the received content on the display corresponding to the non-driver seat in the driving mode of the user, and, then, the processor 460 may display the content on a display corresponding to the driver-seat when the driving mode is converted into the non-driving mode of the user.

According to one embodiment, when the determined display includes the first display, for example, when the determined display is a display corresponding to the driver-seat, the processor 460 may not present or may present the received content on a display corresponding to the driver-seat, depending on the user's driving or non-driving mode.

According to one embodiment, the processor 460 determines whether the user is in a driving or non-driving mode based on the vehicle information. When the user is in the driving mode, the processor 460 may or may not present the received content on a display corresponding to the driver-seat, depending on the type of the received content. In this case, when the received content is of the first type, the processor 460 presents the received content on a display corresponding to the driver-seat. When the received content is of the second type, the processor 460 may not present the received content on a display corresponding to the driver-seat.

According to one embodiment, when the user is in the non-driving mode, the processor 460 may present the content on a display corresponding to the driver-seat regardless of the type of the received content. The content of the first type may include at least one of text content, driving-related content, or still image content, for example. The content of the second type may include at least one of moving picture content, game content, or image content of three or more dimensions, for example. According to the above-described embodiment, in the driving mode of the user, the processor 460 may limit presentation of the content (for example, content of second type) that may distract the driver's attention on the display corresponding to the driver-seat.

The processor 460 determines, based on the vehicle information, whether the user is in a driving or non-driving mode. When the vehicle in an autonomous driving off state, and the gear mode is in a R mode or D mode, and the vehicle speed is above a specified speed, the processor 460 may determine that the user is in a driving mode. The vehicle information may include, for example, gear mode information, vehicle speed information, and autonomous driving on/off information. Further, the processor 460 may determine, from the vehicle information, that the user is in a non-driving mode when the autonomous driving mode is activated or the gear mode is in a N mode or P mode.

According to one embodiment, when the processor 460 may determine the type of content, the processor may check the type of the content based on file name extension information of the content. For example, when the processor 460 can recognize the file name extension information of the received content, the processor 460 may determine whether the received content corresponds to a first type or a second type based on type-based file name extension information. In another example, when the processor 460 cannot recognize the file name extension information of the received content, for example, when the received content is received from the user equipment, the processor 460 may request the user equipment to transmit the extension information of the content to the processor. According to various embodiments, the processor 460 may analyze features of the content (e.g., a frame rate, etc.) and then determine the type of the received content based thereon.

According to one embodiment, when presenting the received content on a display corresponding to the driver-seat in a driving mode of the user, the processor 460 may convert the received content according to a specified specification and then present the converted content on the display corresponding to the driver-seat. For example, the processor 460 may convert the size of the text included in the received content to the first specified size or the processor 460 may convert a size of an icon (for example, a picture, a menu icon, etc.) included in the received content into a second specified size. As another example, the processor 460 may adjust a spacing between the texts or icons included in the received content. In one embodiment, when the processor 460 determines that the user is in the non-driving mode while the processor 460 is presenting the converted content on the display corresponding to the driver-seat, the processor 460 stops converting the received content, and the, the processor may present the content on the display corresponding to the driver-seat without converting the received content.

According to one embodiment, when presenting the received content on a display corresponding to the driver-seat in a user's driving mode, the processor 460 checks, via the sensor module 410, whether there is a non-driver passenger in the vehicle. When the non-driver passenger is absent in the vehicle, the processor 460 may present an effect corresponding to the received content on a display corresponding to the non-driver seat. For example, when a user requests to use a display corresponding to a non-driver seat via the input device 420, the processor 460 may present an effect corresponding to the received content on a display corresponding to the non-driver seat. As another example, when the received content is audio content, the effect corresponding to the audio content may include lyric information of the audio content or image information associated with the audio content.

According to one embodiment, when the determined display is not a display corresponding to the driver-seat, or the user is in a non-driving mode, the processor 460 may present the received content on a display corresponding to the received content, regardless of the type of the received content.

According to one embodiment, the processor 460 may further present the driving-related content, which is presented on a display corresponding to the driver-seat on the display corresponding to the non-driver seat. For example, while the processor 460 is presenting route guidance content to a destination on the display (corresponding to a first display) corresponding to the driver-seat, the processor 460 may present the route guidance content on the display corresponding to the driver-seat and on the rear-seat display (corresponding to a fourth display) when the current location is within a specified distance from the destination.

According to one embodiment, the processor 460 may further present the second type content presented on the second display on the display corresponding to the driver-seat. For example, the processor 460 recognizes a facial expression change of the non-driver passenger on the front non-driver seat via the camera of the sensor module 410. Then, the processor 460 determines, based on the facial expression change, whether the non-driver passenger on the front non-driver seat is interested in content of a second type. When the non-driver passenger on the front non-driver seat is interested in the content of the second type, the processor may present the content of the second type on at least one of the middle display or the cluster display. When the processor 460 presents the content of the second type on the cluster display, the processor 460 may present the content of the second type only on a designated area of the cluster so that the presentation does not interfere with the checking of the driving information by the driver.

According to one embodiment, the processor 460 checks whether the user is concentrating on driving via a camera corresponding to a driver-seat in the sensor module 410. When the driver is not concentrating on the driving, the processor 460 may display a warning on the display corresponding to the front non-driver seat or rear-seat or may switch the vehicle mode to autonomous driving mode.

According to one embodiment, the processor 460 may present the vehicle-related safety information on the first display and a display corresponding to the non-driver seat. The vehicle-related safety information may include, for example, vehicle malfunction information (for example, fault code).

According to various embodiments, the processor 460 may present a third type of content on a display corresponding to the location of the driver. The third type of content may include, for example, the user's phonebook content or the content of the application for driver authentication. The processor 460 may recognize, for example, a face of a designated driver via the sensor module 410, or may identify a location of user equipment of the user via the communication module 430 and, then, the processor 460 may determine the identified location as the location of the driver. The processor 460 may present third type content on a display corresponding to the determined driver location.

According to various embodiments, the processor 460 may sense a current location of the vehicle via, for example, the communication module 430 (e.g., a GPS sensor). When the current location of the vehicle is a specified location, the processor 460 may present advertisement information corresponding to the specified location on at least one of the first display or the second display.

According to the above-described embodiment, the processor 460 may limit the presentation of the content that may distract the driver's attention on the display corresponding to the driver-seat in the user's driving mode. As a result, safety accidents caused by the distraction of the attention may be prevented in advance.

According to an embodiment, vehicular electronic device (e.g., the vehicular electronic device 40 of FIG. 4) comprises a first communication circuit (e.g., the first communication circuit 431 of FIG. 4) configured to receive content; a second communication circuit (e.g., the second communication circuit 432 of FIG. 4) configured to receive vehicle information; a first display (e.g., at least one of the first display 110 or the second display 120 of FIG. 1) corresponding to a driver-seat and a second display (e.g., at least one of the third display 130 or the fourth display 140 of FIG. 1) corresponding to a non-driver seat; and a processor device (e.g., the processor 460 of FIG. 4) operatively connected to the first display, the second display, the first communication circuit, and the second communication circuit, wherein the processor is configured upon receiving the content via the first communication circuit, to determine a display to present the received content from among the first display or the second display; upon determination that the first display is to present the received content, to determine, based on the received vehicle information from the second communication circuit, whether a user is in a driving mode; upon determination that the user is in the driving mode, to identify a type of the received content; when the received content is of a first type, to present the received content on the first display; and when the received content is of a second type, not to present the received content on the first display.

Wherein the processor is further configured when presenting the received content on the first display, to convert the received content, and to present the converted content on the first display.

Wherein the processor is further configured to convert at least one of sizes of a text and an icon included in the received content to a specified size.

Wherein the processor is further configured when presenting the converted content on the first display, and upon determination based on the vehicle information that the user is in a non-driving mode, to stop the conversion of the received content and to present the received content on the first display.

Wherein the processor is further configured upon determination based on the vehicle information that the user is in a non-driving mode, to present the received content on the determined display regardless of the type of the received content.

Wherein the content of the first type includes at least one of text content, driving-related content, or still image content.

Wherein the content of the second type includes at least one of moving picture content, game content, or image content of three or higher dimensions.

Wherein the vehicle information includes gear mode information, vehicle speed information, and autonomous driving on/off information, wherein when gear mode is in a R mode or D mode in an autonomous driving off state based on the gear mode information and the autonomous driving on/off information and when vehicle speed is equal to or greater than the specified speed based on the vehicle speed information, the processor is further configured to determine that the user is in a driving mode.

Wherein the vehicle information includes gear mode information, vehicle speed information, and autonomous driving on/off information, wherein when gear mode is in a N mode or P mode based on the gear mode information or when the vehicle is in an autonomous driving on state based on the autonomous driving on/off information, the processor is further configured to determine that the user is in a non-driving mode.

Wherein the processor is further configured to determine a location of user equipment via the second communication circuit; and to determine a display relatively closer to the location of the user equipment among the first display and the second display as the display to present the content.

The vehicular electronic device further comprises at least one sensor circuit (e.g., sensor module 410 of FIG. 4), wherein the processor is further configured to determine a location of the user based on information sensed by the at least one sensor circuit; and to determine a display relatively closer to the user's location among the first display and the second display as the display to present the content.

Wherein the received content includes at least one of content mirrored from user equipment via the first communication circuit or content received from a server device.

The vehicular electronic device further comprises at least one sensor, wherein the processor is further configured when presenting the received content on the first display in the user's driving mode, to determine, using the at least one sensor, whether there is a non-driver passenger in the vehicle; upon determination that the non-driver passenger is absent in the vehicle, to present an effect corresponding to the received content on the second display.

Figure 5:
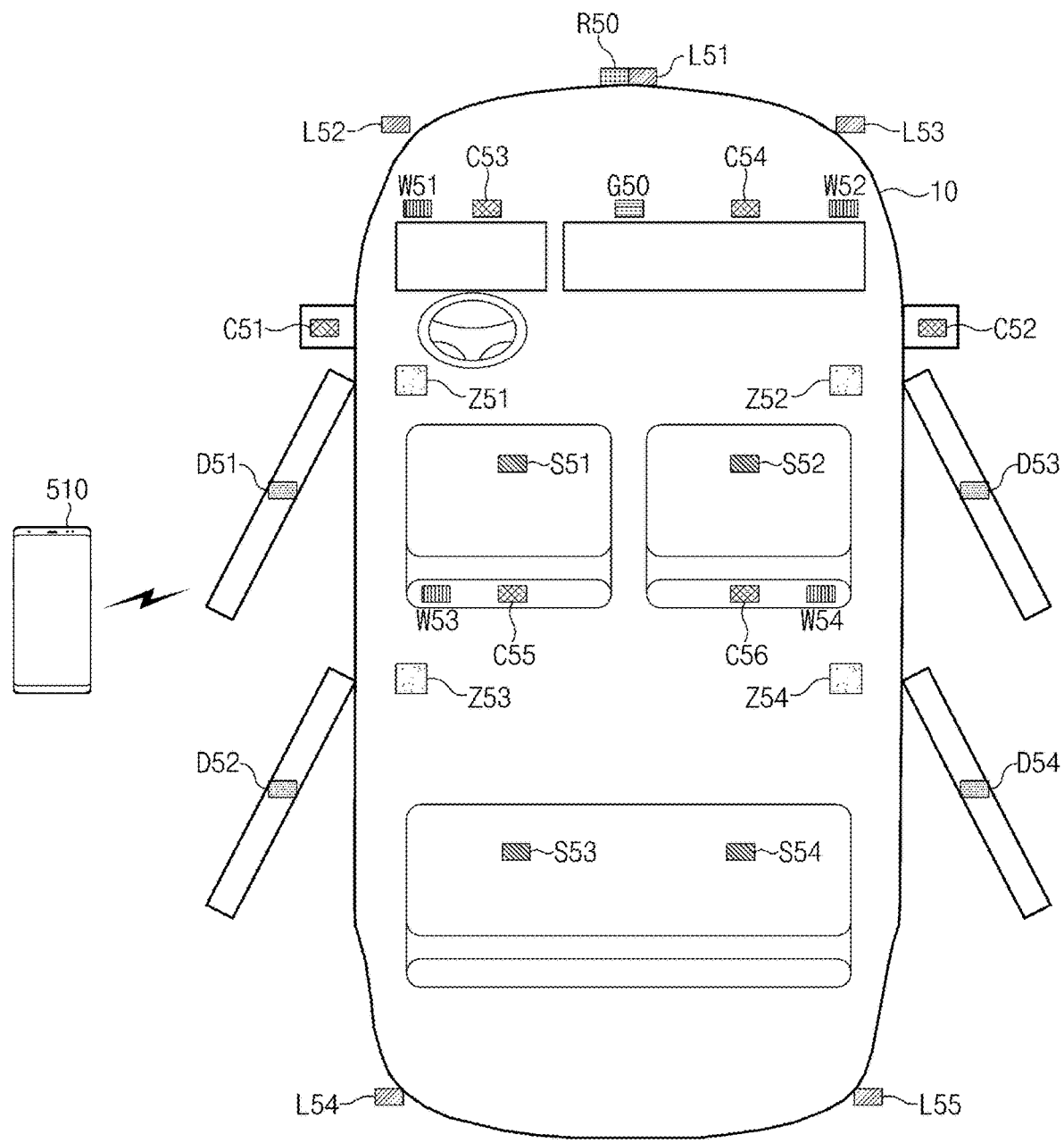
FIG. 5 shows an arrangement of a sensor module and a communication module according to one embodiment.

FIG. 5 shows an arrangement of the sensor module 410 and communication module 430 according to one embodiment.

Referring to FIG. 5, according to one embodiment, the sensor module 410 (for example, sensor module 410 of FIG. 4) may include at least one of a plurality of lidars L51, L52, L53, L54, and L55, a radar R50, a first image sensor C51, a second image sensor C52, or a plurality of door sensors D51, D52, D53, and D54 outside of the vehicle. The plurality of lidars L51, L52, L53, L54, and L55, the radar R50, the first and second image sensors C51 and C52 may recognize obstacles or lanes around the vehicle. The plurality of lidars L51, L52, L53, L54, and L55, the radar R50, the first and second image sensors C51 and C52 may be used for vehicle autonomous driving. The plurality of door sensors D51, D52, D53, and D54 may sense door opening and closing or sense user equipment 510 passing through the door, in accordance with the commands from the processor 460 (for example, processor 460 in FIG. 4). When a plurality of door sensors D51, D52, D53, and D54 are capable of detecting user equipment passing through the door, each of the plurality of door sensors D51, D52, D53 and D54 includes a communication circuit. The plurality of door sensors D51, D52, D53 and D54 may verify a strength of a signal of the user equipment received via the communication circuit. In this case, the processor 460 may use the identified signal strength to verify whether the user equipment passes through the door.

According to one embodiment, the sensor module 410 may include at least one of a third image sensor C53, a fourth image sensor C54, a fifth image sensor C55, a sixth image sensor C56 or a plurality of seat sensors S51, S52, S53, and S54 inside the vehicle. Each of the third to sixth image sensors C53, C54, C55, and C56 is provided in front of each seat. A person (for example, a face thereof) boarded in each seat may be photographed by each image sensor. The plurality of seat sensors S51, S52, S53 and S54 may be, for example, weight sensors and may sense the weight on the seat.

According to one embodiment, the communication module 430 (for example, the communication module 430 of FIG. 4) may include first to fourth communication circuits W51, W52, W53, and W54. Each of the first to fourth communication circuits W51, W52, W53 and W54 may include, for example, a WiFi access point. Each of the first to fourth communication circuits W51, W52, W53 and W54 may establish a communication channel for communicating with the user equipment 510. At least one of the first to fourth communication circuits W51, W52, W53 and W54 may be omitted. The communication module 430 may further include a fifth communication circuit G50 for communication with the server device 20. The communication module 430 may further include sixth to ninth communication circuits Z51, Z52, Z53, and Z54 respectively provided in the plurality of chargers. Each of the sixth to ninth communication circuits Z51, Z52, Z53 and Z54 may establish a communication channel for communicating with the user equipment 510. Each of the sixth to ninth communication circuits Z51, Z52, Z53, and Z54 may perform, for example, NFC or Bluetooth communication.

According to one embodiment, the processor 460 may check the location of the user using at least one of the sensor module 410 and the communication module 430. The user's location may include, for example, the location of the user equipment.

The processor 460 may receive current location information (GPS information) of the user equipment 510 via the fifth communication circuit G50 and thus verify the current location information of the user equipment 510. In this case, the processor 460 may wake up the vehicular electronic device 40 at a specified cycle and check current location information of the user.

When the processor 460 confirms that the user equipment 510 is within a specified distance (for example, 10 m) from the current location information, the processor may establish communication with the user equipment 510 using at least one of the first to fourth communication circuits W51, W52, W53, and W54. For example, the processor 460 may establish communication with the most connected user equipment or last connected user equipment based on communication history information. In another example, the processor 460 may establish communications with user equipment corresponding to specified IP information.

When the user opens the door, the processor 460 may also verify the location of the door through which the user has passed or the location of the open door via the plurality of door sensors D51, D52, D53, and D54. For example, the processor 460 may determine which door of doors corresponding to the driver-seat and the non-driver seat is opened or through which the user has passed.

The processor 460 may determine the location of the user in the vehicle using at least one of the third to sixth image sensors C53, C54, C55, and C56, the first to fourth communication circuits W51, W52, W53, and W54, the sixth to a ninth communication circuits Z51, Z52, Z53 and Z54, and the seat sensors S51, S52, S53, and S54. For example, the processor 460 may capture a plurality of seats via the third to sixth image sensors C53, C54, C55 and C56 respectively arranged in front of a plurality of seats. The processor extracts a user's face image from the photographed seat image. The processor may determine a seat corresponding to the image sensor having the extracted face as a location of the user. In another example, the processor 460 verifies sensitivities of signals received from the user equipment 510 via the first to fourth communication circuits W51, W52, W53, and W54. The processor 460 may determine a seat close to a communication circuit having the strongest reception sensitivity among the first to fourth communication circuits W51, W52, W53, and W54 as a location of the user. In another example, the processor 460 may verify sensitivities of signals received from the user equipment 510 via the sixth to ninth communication circuits Z51, Z52, Z53, and Z54. The processor 460 may determine a seat close to a communication circuit having the strongest reception sensitivity among the sixth to ninth communication circuits Z51, Z52, Z53, and Z54 as the location of the user. As another example, the processor 460 may sense a weight on each seat from each of the plurality of seat sensors S51, S52, S53, and S54. The processor may determine, as the location of the user, a seat whose sensed weight has a weight greater than or equal to a threshold weight. According to various embodiments, the processor 460 may determine the location of the user in the vehicle using at least two of the third to sixth image sensors C53, C54, C55, and C56, the first to fourth communication circuits W51, W52, W53, and W54, the sixth to a ninth communication circuits Z51, Z52, Z53 and Z54, and the seat sensors S51, S52, S53, and S54.

Figure 6A:
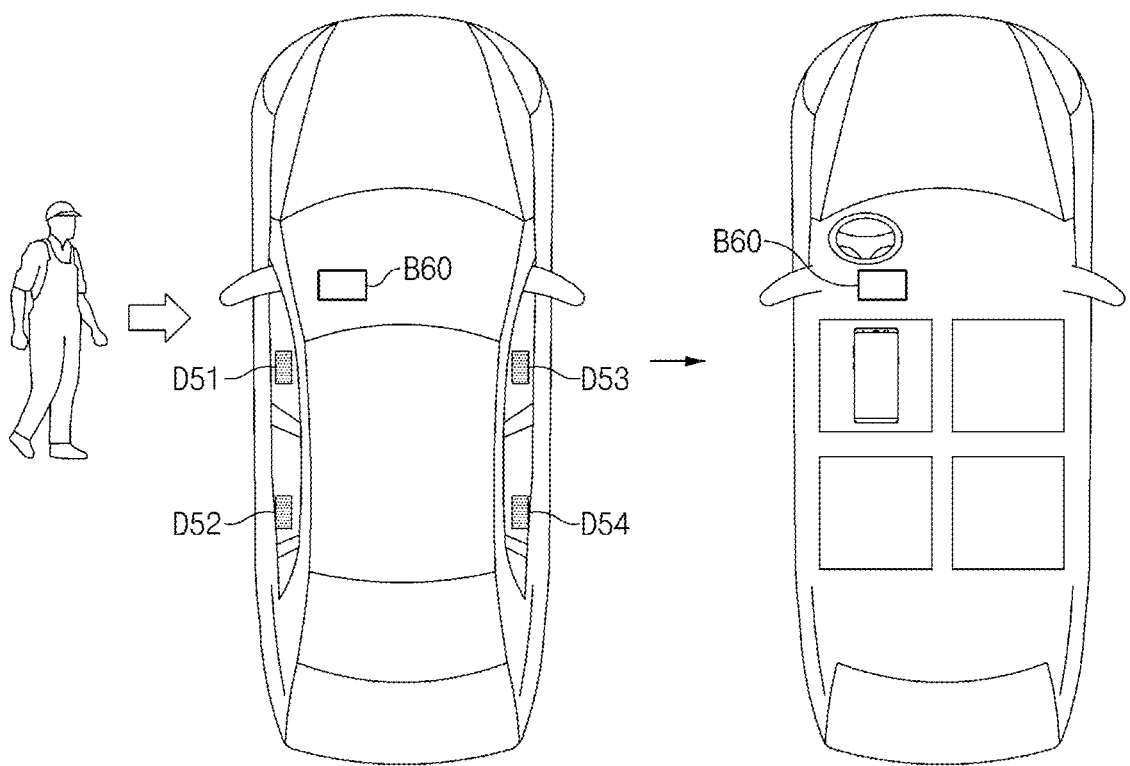
FIGS. 6A and 6B are illustrations of a user's location detection using a plurality of door sensors and Bluetooth communication circuits in accordance with one embodiment.
Figure 6B:
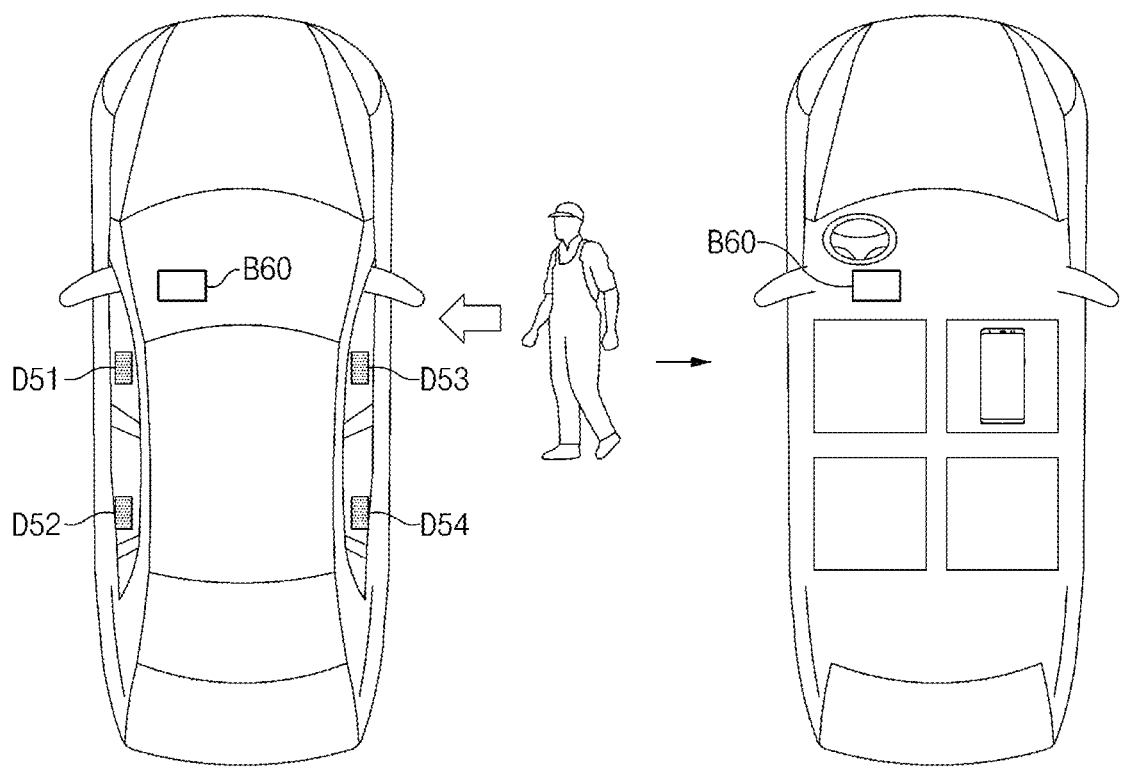

FIGS. 6A and 6B are illustrations of a user's location detection using a plurality of door sensors and Bluetooth communication circuits in accordance with one embodiment.

Referring to FIG. 6A, when the processor 460 (for example, the processor 460 of FIG. 4) detects an opening of a corresponding door to the driver seat via the door sensor D51 corresponding to the driver-seat, the processor 460 may verify a sensitivity of a signal received from the user equipment via a Bluetooth communication circuit B60 in the vehicle. When the identified sensitivity is greater than or equal to a first threshold sensitivity corresponding to the predicted driver-seat, the processor 460 may determine the user's location as the driver-seat.

Referring to FIG. 6B, the processor 460 (for example, processor 460 of FIG. 4) may sense an opening of a door corresponding to the front non-driver seat via the door sensor D53 corresponding to the front non-driver seat. Then, the processor 460 may verify a sensitivity of a signal received from the user equipment via the Bluetooth communication circuit B60. When the identified sensitivity is smaller than the first threshold sensitivity corresponding to the predicted driver-seat and greater than or equal to a second threshold sensitivity corresponding to the front non-driver seat, the processor 460 may determine the location of the user as the front non-driver seat.

Figure 7:
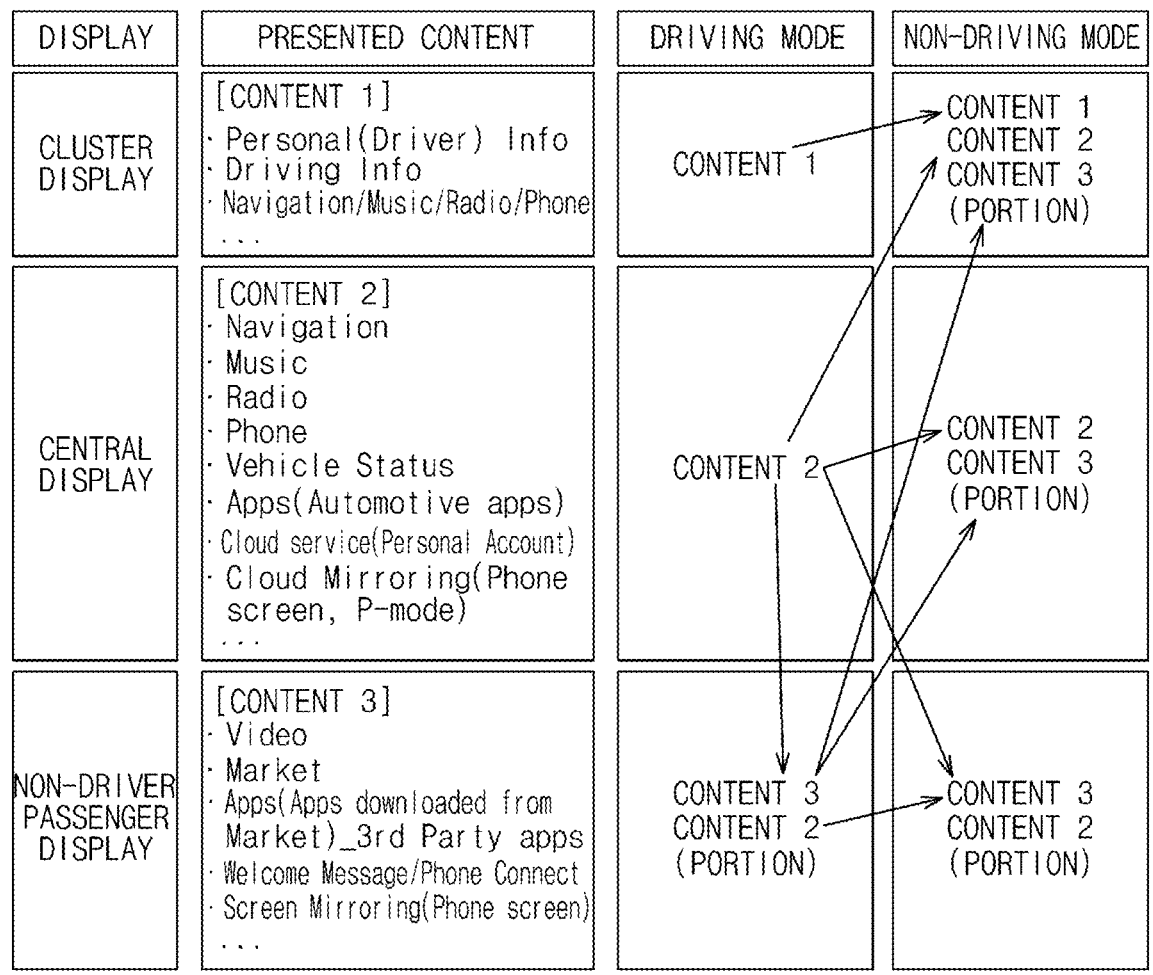
FIG. 7 shows an example of content displayed for each display according to one embodiment.

FIG. 7 shows an example of content displayed for each display according to one embodiment.

Referring to FIG. 7, a cluster display (for example, first display 110 in FIG. 1) may present content 1, including, for example, personal information (driver information) contents, driving information contents, navigation information contents, music contents, radio contents, phone-book information contents, etc.

The middle display (for example, second display 120 of FIG. 1) may also present content 2, which includes, for example, navigation content, music content, radio content, phonebook information content, vehicle status information content, automotive application content, cloud service content, screen mirroring content, or the like.

The display (for example, the third display 130 of FIG. 1) corresponding to the non-driver passenger (corresponding to the front non-driver seat/rear seat) may also present content 3, which includes video content, market App content, downloaded App content, welcome message/phone connection, and screen mirrored content, or the like.

In the user's driving mode, the processor 460 (for example, the processor 460 of FIG. 4) may present the content 1 on the cluster display, present the content 2 on the middle display and present the content 3 on the on-driver passenger display.

In the user's non-driving mode, the processor 460 may present the content 1, the content 2, and a portion of the content 3 on the cluster display. The processor 460 may present the content 2 and a portion of the content 3 on the middle display in the non-driving mode of the user. In this case, the portion of the content 3 may include video content, market App content, downloaded App content, and screen mirrored content.

The processor 460 may present the content 3 and a portion of the content 2 in a non-driving mode of the user. In this case, the portion of the content 2 may include navigation content, music content, radio content, vehicle status information content, automobile app content, and screen mirrored content, or the like.

FIG. 8 shows an example of a display of content for each display as a location of a driver changes according to one embodiment. In FIG. 8, a first scenario may be a scenario where the user (e.g., owner of vehicular electronic device or vehicle) is located on the driver-seat, a second scenario may be a scenario where the user is located on the front non-driver seat, and a third scenario may be a scenario where the user is located on the rear-seat. In FIG. 8, the user's location may be the location of the user equipment 510 at a given IP address, or may be a seat location having a specified driver face.

Referring to third columns of a second row, a fifth row and a seventh row in FIG. 8, the processor 460 (for example, the processor 460 in FIG. 4) may present, in the driving mode of the user (a driver) or driver and regardless of a location of the driver, on the display corresponding to the driver-seat, first type of content received via a driving-related App (driving-related App among IVI 3rd party downloaded Apps) installed in the vehicular electronic device 40 or a driving-related App (driving-related App among mobile Apps) installed in the user equipment 510. The display corresponding to the driver-seat may include at least one of the middle display or the cluster display.

Referring to third columns of a third row and a sixth row in FIG. 8, the processor 460 may present, regardless of a location of the driver, on a display corresponding to the front non-driver seat, third type of content received via a driving-related App or driving-related auxiliary App installed in the vehicular electronic device 40.

Referring to third columns of a fourth row and an eighth row in FIG. 8, the processor 460 may present, regardless of a location of the user or regardless of whether the driver (e.g., a current driver of the vehicle) is in a driving or non-driving mode, on a display corresponding to the rear seat, first type of content and second type of content.

Referring to a fourth column in FIG. 8, the processor 460 may present the content of the second type in the non-driving mode of the user on the display corresponding to the driver-seat.

Referring to a second row, a sixth row, and an eighth row in FIG. 8, the processor 460 may present fourth type of content corresponding to a personal App or a driving App installed in the vehicular electronic device 40 on a display corresponding to the location of the user. The fourth type of content may include, for example, hand-free content or driver authentication App content.

Figure 9:
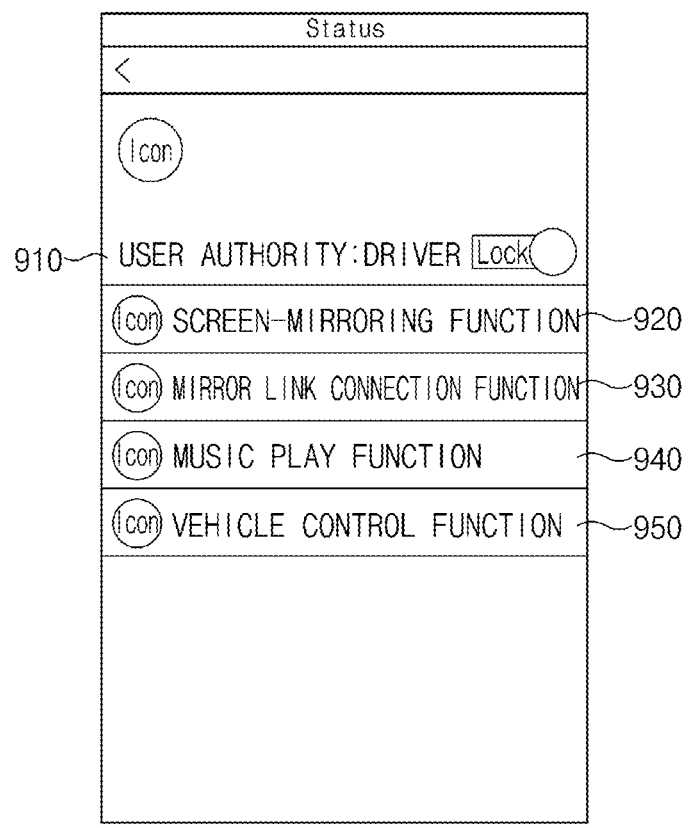
FIG. 9 shows a UI screen of an App installed in the user equipment for controlling the vehicular electronic device according to one embodiment.

FIG. 9 shows an UI screen of an App installed in the user equipment for controlling the vehicular electronic device according to one embodiment.

Referring to FIG. 9, the UI screen of the application installed in the user equipment 510 (for example, user equipment 510 in FIG. 5) may display the authority of the user 910 (for example, driver, passenger on the front non-driver seat, passenger on the rear seat, etc.). The UI screen may include information 920, 930, 940, and 950 about the IVI functionality that is executable in conjunction with the vehicular electronic device 40. The IVI function may include, for example, a screen mirroring function, a mirror link connection function, a music reproduction function, and a vehicle control function. The screen mirroring function may include, for example, a function to display a screen of the user equipment 510 equally on the display of the vehicular electronic device 40. The mirror link connection function may be, for example, a function of integrating the user equipment 510 and the vehicular electronic device 40. The music playback function may be, for example, a function of reproducing the music stored in the user equipment 510 using a speaker connected to the vehicular electronic device 40. The vehicle control function may be, for example, a function of controlling each function (for example, air conditioner/audio/radio control) of the vehicular electronic device 40 via the user equipment 510. In various embodiments, the screen of FIG. 9 may be a screen of the first display or the second display in the vehicular electronic device 40.

Figure 10:
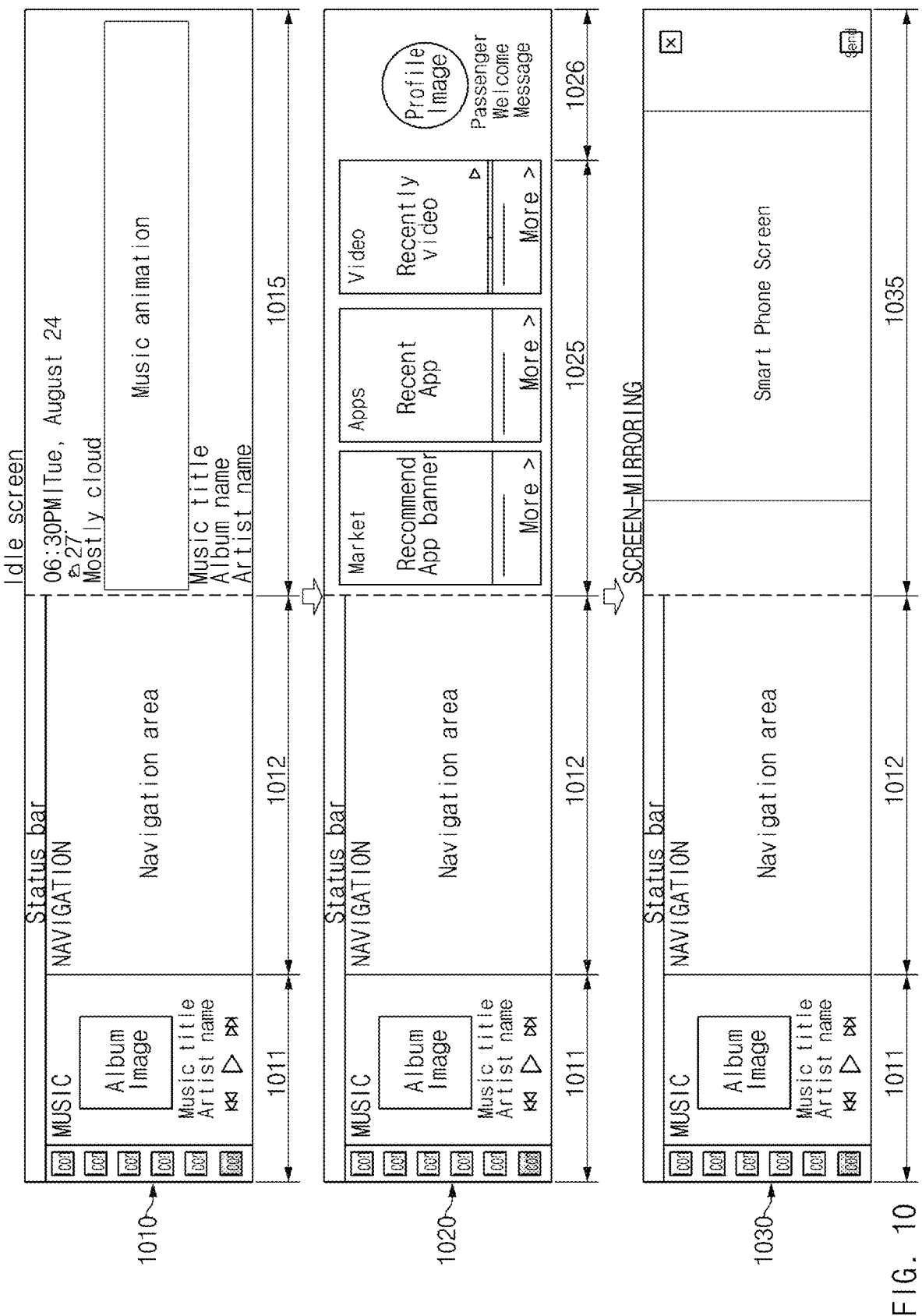
FIG. 10 shows UI screens of a center display and a front non-driver seat display according to one embodiment.

FIG. 10 shows UI screens of the middle display and the display corresponding to the front non-driver seat according to one embodiment.

Referring to FIG. 10, at operation 1010, when music playback-related UI content 1011 and navigation function-related UI content 1012 are presented on the middle display (for example, 120 in FIG. 1), the processor 460 may present animation content 1015 associated with the music being played back on the display corresponding to the front non-driver seat. At operation 1010, the processor is communicatively coupled with the user equipment of the driver corresponding to the driver-seat, while the processor is not in communication with the user equipment of the passenger corresponding to the front non-driver seat.

In operation 1020, when the processor is communicatively coupled to user equipment of a non-driver passenger on the front non-driver seat, the processor 460 may present, on a display corresponding to the front non-driver seat, content 1025 relating to a function controllable by the front non-driver seat and a function capable of being associated with the user equipment. The processor 460 may further present welcome message content 1026 for the non-driver passenger on the front non-driver seat on the display (for example, 130 in FIG. 1) corresponding to the front non-driver seat. The processor 460 may be communicatively coupled to the user equipment of the non-driver passenger on the front non-driver seat based on a user input via the input device 420.

In operation 1030, when the non-driver passenger on the front non-driver seat requests the screen mirroring function via the input device 420, the processor 460 may present screen-mirrored content 1035 from the user equipment 510 of the non-driver passenger on the front non-driver seat, on the display corresponding to the front non-driver seat.

Figure 11:
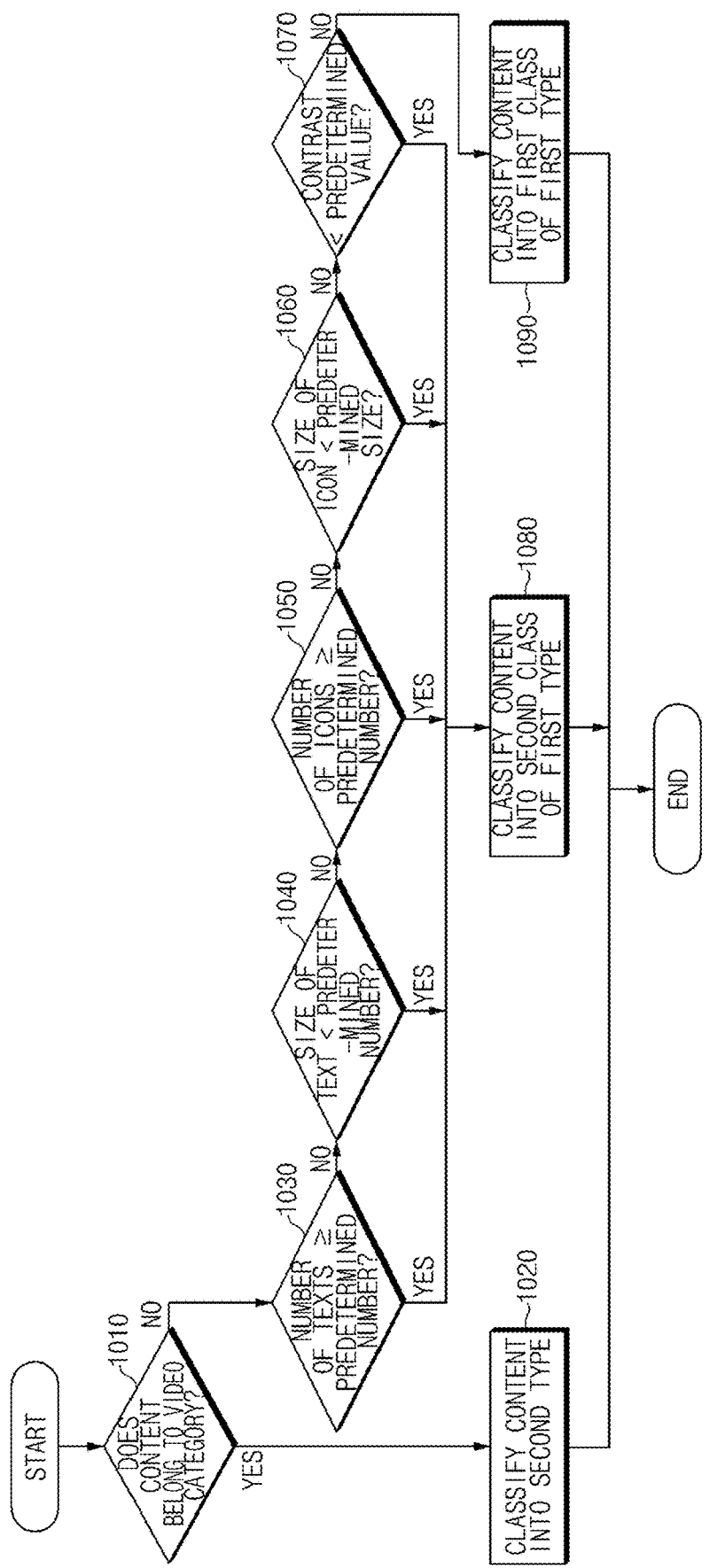
FIG. 11 shows a flowchart of a content classification method according to one embodiment.

FIG. 11 shows a flow chart of a content classification method according to one embodiment.

Referring to FIG. 11, at operation 1010, the processor 460 (for example, processor 460 in FIG. 4) determines whether the received content belongs to a video category. When the received content belongs to the video category, the processor 460 may classify the content into second type content at operation 1020. The content belonging to the video category may include, for example, moving picture content, game content, and three-dimensional content.

In operation 1010, when the received content does not belong to the video category, the processor 460 may determine, at operation 1030, whether the number of texts is greater than or equal to a specified number. For example, the processor 460 may determine whether the number of texts present on a single line is 10 or more.

When, at operation 1030, it is determined that the number of texts is smaller than the specified number, the processor 460 may determine, at operation 1040, whether a size of the text is smaller than a specified size.

When, at operation 1040, it is determined that the size of text is greater than or equal to the specified size, the processor 460 may determine, at operation 1050, whether the number of icons requiring icon interaction is greater than or equal to a specified number.

When it is determined at operation 1050 that the number of icons is smaller than the specified number, the processor 460 may determine, at operation 1060, whether a size of the icon is smaller than a specified size.

When, at operation 1060, it is determined that the size of the icon is larger than or equal to the specified size, the processor 460 may determine, at operation 1070, whether a contrast of the image or text included in the content is smaller than a specified value.

When, at operation 1070, it is determined that the contrast of the image or text included in the content is greater than or equal to the specified value, the processor 460 may classify the received content into content belonging to a first class of the first type at operation 1090. When the processor 460 presents the content belonging to the first class of the first type on the display corresponding to the driver-seat in the user's driving mode, the processor may present the content without converting the content.

When, at operation 1080, it is determined that the number of texts or icons is equal to or greater than the specified number, the size of the text or icon is smaller than the specified size, or the contrast of the text or icon is lower than the specified value, the processor 460 may classify the received content into content belonging to a second class of the first type. In the driving mode of the user, the processor 460 may convert the content belonging to the second class of the first type to a specified standard and may present the converted content.

The various operations in the flowchart of FIG. 11 may be performed in the order shown in the drawing, in a different order, or concurrently. Moreover, in some embodiments, some operations, blocks, steps, or equivalents may be varied, for example, be omitted, added, modified, or skipped without departing from the scope of the disclosed embodiments.

Figure 12:
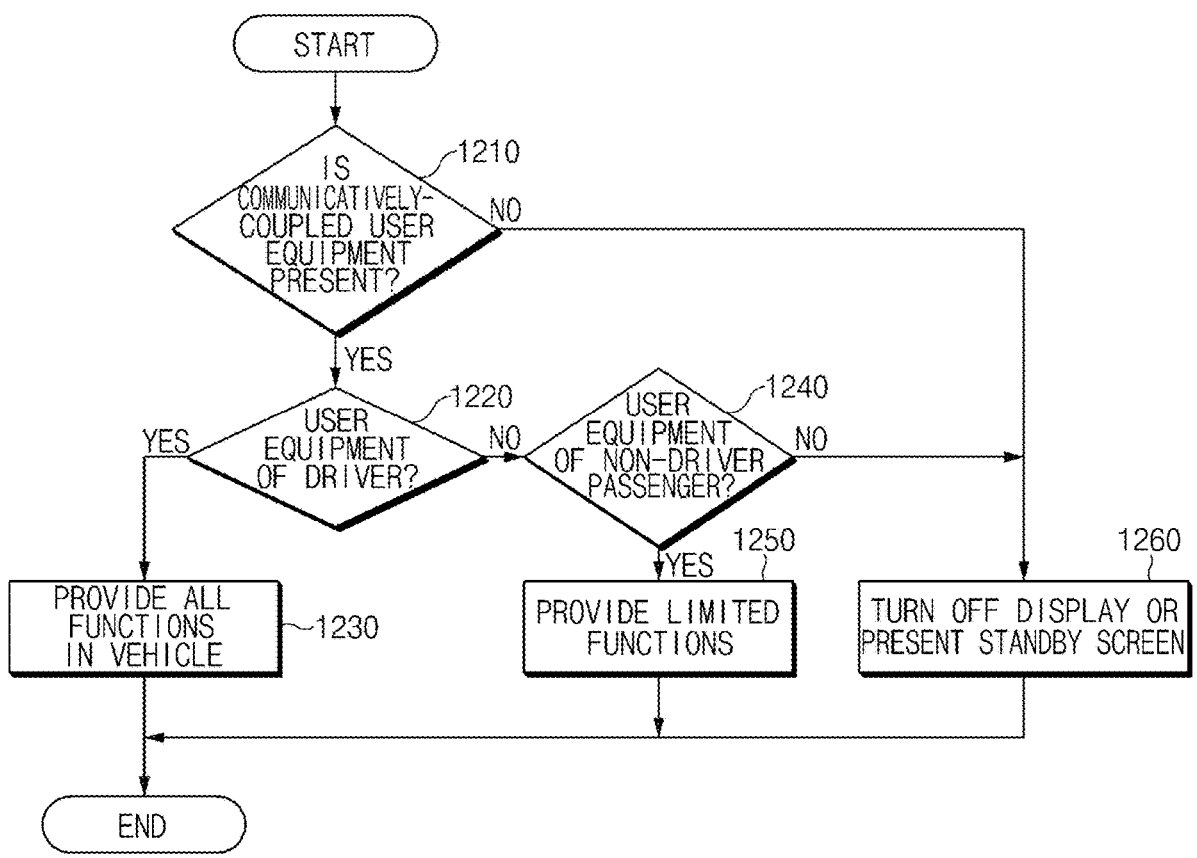
FIG. 12 shows a flowchart of a method for providing differentiated services between a driver and a non-driver passenger according to one embodiment.

FIG. 12 shows a flowchart of a differential service provision method for driver and non-driver passenger according to one embodiment.

Referring to FIG. 12, at operation 1210, the processor 460 (for example, processor 460 of FIG. 4) may determine whether there is user equipment communicatively coupled to the processor.

When, at operation 1210, it is determined that there is the user equipment communicatively coupled to the processor, the processor 460 may, at operation 1220, determine whether the communicatively coupled user equipment is user equipment corresponding to the driver. For example, when an IP address of the communicatively-coupled user equipment connected to the processor 460 is a specified IP address of the user equipment of the driver, the processor may determine the communicatively coupled user equipment to be the user equipment of the driver.

When the communicatively-coupled user equipment is a user equipment of the driver, the processor 460 may provide all controllable functions to the vehicular electronic device 40 at operation 1230. For example, the processor 460 may provide functions performable via driver authentication.

When the communicatively-coupled user equipment is not the user equipment of the driver, at operation 1240, the processor 460 may determine whether the communicatively-coupled user equipment is a user equipment of the non-driver passenger. For example, the processor 460 may use the sensor module 410 to determine whether there is a non-driver passenger in the vehicle. When there is a non-driver passenger in the vehicle, the processor 460 may determine that the communicatively-coupled user equipment is the user equipment of the non-driver passenger.

When the communicatively-coupled user equipment is the non-driver passenger user equipment, the processor 460 may provide limited functionality to the user equipment of the non-driver passenger at operation 1250. For example, the functions provided by the processor 460 may vary depending on the seat occupied by the non-driver passenger. The functions as provided may be limited to functions that can be performed through driver authentication.

When there is no communicatively-coupled user equipment, or when the communicatively-coupled user equipment is not the user equipment of the non-driver passenger, the processor 460 may turn off the display corresponding to the front non-driver seat, or present a standby screen on the display corresponding to the front non-driver seat, at operation 1260.

Figure 13:
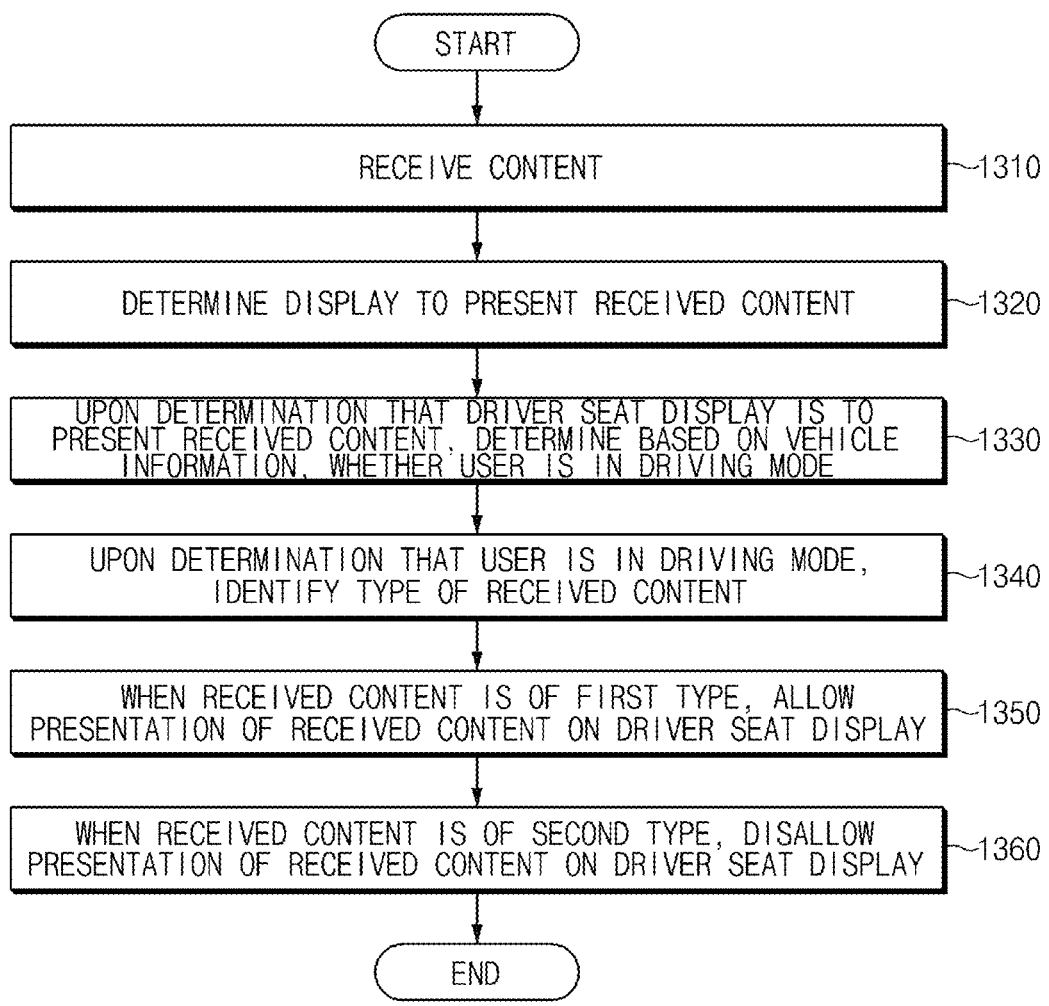
FIG. 13 shows a flowchart of a content presentation method according to one embodiment.

FIG. 13 shows a flowchart of a content presentation method according to one embodiment.

Referring to FIG. 13, at operation 1310, the processor 460 may receive content via the first communication circuit 431.

When the processor 460 receives the content, the processor may determine, at operation 1320, a display for presenting the received content among a display corresponding to the driver-seat or a display corresponding to a front non-driver seat.

When the display determined by the processor 460 includes a display corresponding to the driver-seat, the processor 460 may, at operation 1330, determine whether the user is in a driving mode based on the vehicle information received via the second communication circuit 432.

When the user is in a driving mode, at operation 1340, the processor 460 may determine the type of the received content.

When the received content is of the first type, at operation 1350, the processor 460 may present the received content on a display corresponding to the driver-seat.

When the received content is of the second type, at operation 1360, the processor 460 may not present the received content on a display corresponding to the driver-seat.

According to an embodiment, a method for presenting content by a vehicular electronic device (e.g., vehicular electronic device 40 of FIG. 4), the method comprises receiving content; determining a display to present the received content from among a first display or a second display, wherein the first display corresponds to a driver-seat and the second display corresponds to a non-driver seat; upon determination that the first display is to present the received content, determining, based on vehicle information, whether a user is in a driving mode; upon determination that the user is in the driving mode, identifying a type of the received content; when the received content is of a first type, allowing presentation of the received content on the first display; and when the received content is of a second type, disallowing presentation of the received content on the first display.

Wherein the allowing presentation of the received content on the first display includes converting the received content; and presenting the converted content on the first display.

Wherein the converting of the received content includes converting at least one of sizes of a text and an icon included in the received content to a specified size.

Wherein the presenting of the converted content on the first display includes upon determination based on the vehicle information that the user is in a non-driving mode, stopping the conversion of the received content and presenting the received content on the first display.

The method further comprises upon determination based on the vehicle information that the user is in a non-driving mode, presenting the received content on the determined display regardless of the type of the received content.

Wherein the content of the first type includes at least one of text content, driving-related content, or still image content.

Wherein the content of the second type includes at least one of moving picture content, game content, or image content of three or higher dimensions.

Figure 14:
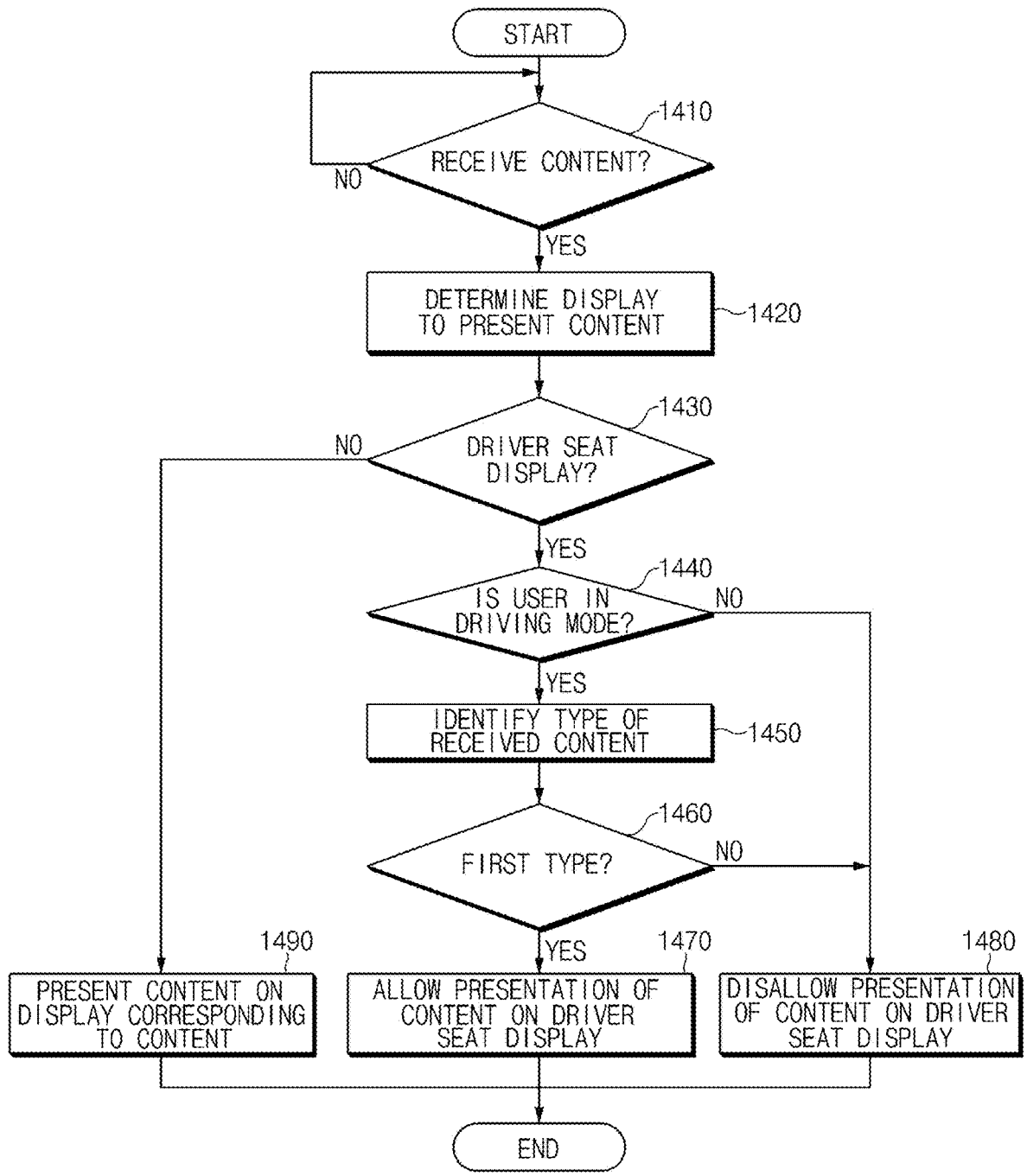
FIG. 14 shows a detailed flowchart of the content presentation method according to one embodiment.

FIG. 14 shows a detailed flowchart of the content presentation method according to one embodiment.

Referring to FIG. 14, at operation 1410, the processor 460 may receive content via a second communication circuit 432. The received content may be received from the user equipment 510 or server device 20.

When the processor 460 receives the content, at operation 1420, the processor 460 may determine a display corresponding to the received content. For example, the processor 460 may sense a user location via the sensor module, and, then, the processor may determine, among the plurality of displays 440, a display that is relatively close to the sensed user location as a display corresponding to the received content. In another example, the processor 460 may determine a location of the user equipment via the communication module 430, and then the processor 460 may determine a display of the plurality of displays 440 that is relatively close to the determined location as a display corresponding to the received content.

At operation 1430, the processor 460 may determine whether the display corresponding to the content is a display corresponding to the driver-seat.

When the display corresponding to the content corresponds to the driver-seat, at operation 1440, the processor 460 may determine whether the user is in a driving mode based on vehicle information. The vehicle information may include, for example, gear mode information, vehicle speed information, and autonomous driving on/off information. For example, when the vehicle is in an autonomous driving off state, and the gear mode is in a R mode or D mode, and the vehicle speed is above a specified speed, the processor may determine that the user is in a driving mode. Further, the processor 460 may determine, from the vehicle information, that the user is in a non-driving mode when the autonomous driving mode is activated or when the gear mode is in a N mode or P mode.

When the user is in a driving mode, at operation 1450, the processor 460 may determine the type of the received content. The type may also include the first and second types. For example, the processor 460 may determine the type of content based on the file name extension information of the content.

At operation 1460, the processor 460 may determine whether the received content is of the first type. The first type content may include at least one of driving-related content, text content, or still image content. The driving-related content may, for example, include content for the route guidance service. The text content may contain texts, numbers, special symbols. The text content may include, for example, personal information (for example, a driver name), receiver information based on a hands-free function (e.g., a caller ID (CID)), etc. The still image content may also include still image content such as, for example, photographs, pictures, or menu icons.

When the received content is of the first type, at operation 1470, the processor 460 may display the received content on a display corresponding to the driver-seat.

When the received content is not of the first type or is of the second type, at operation 1480, the processor 460 may not display the received content on the display corresponding to the driver-seat. The second type may include, for example, content that includes moving picture content, game content, or depth information of more than three dimensions.

When the display corresponding to the received content is not the display corresponding to the driver-seat, at operation 1490, the processor 460 may present the received content on a display corresponding to the received content.

Figure 15:
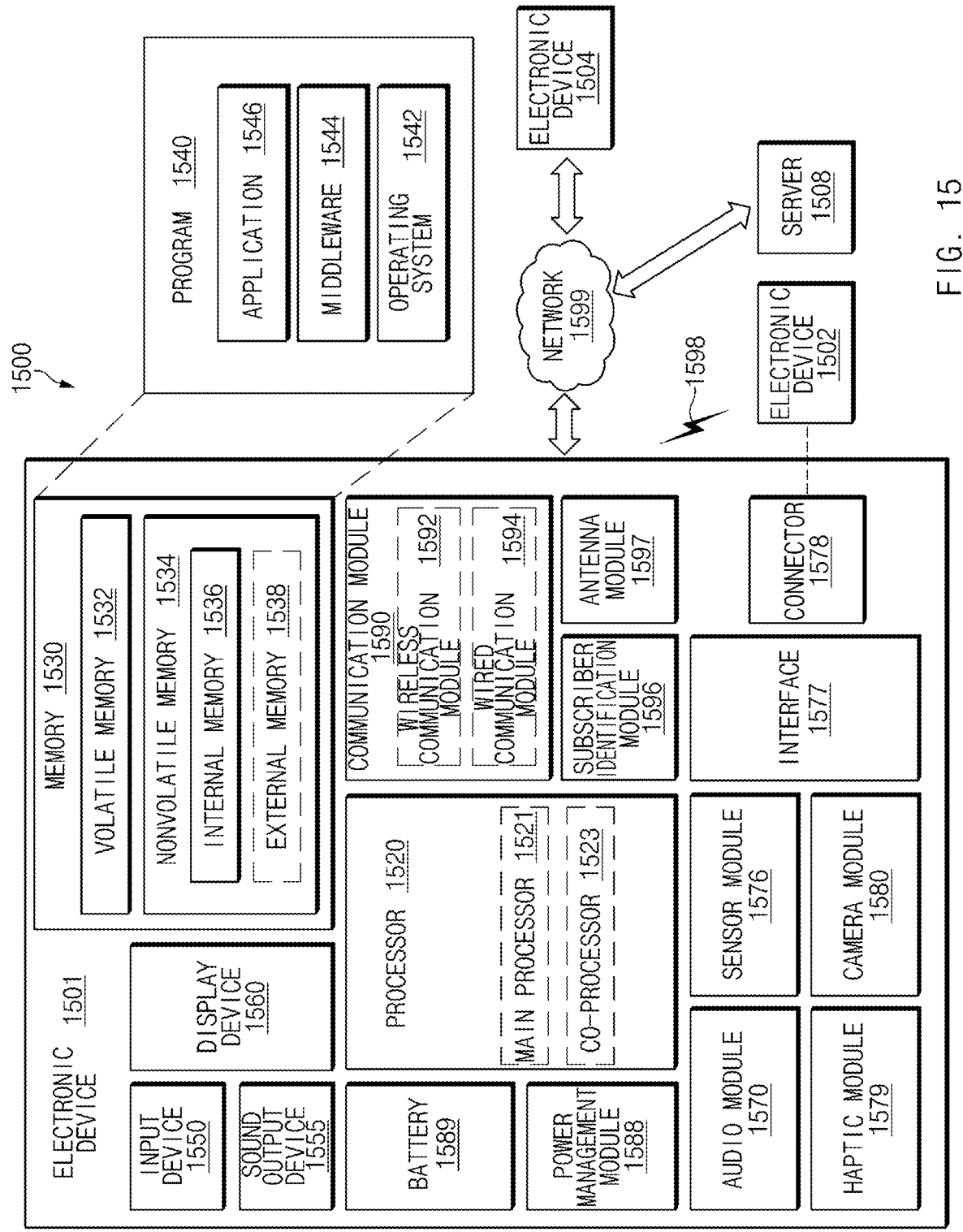
FIG. 15 shows a block diagram of an electronic system in a network environment according to various embodiments.

FIG. 15 is a block diagram illustrating an electronic system 1501 (e.g., Vehicular electronic device 40 of FIG. 4) in a network environment 1500 according to various embodiments. Referring to FIG. 15, the electronic system 1501 in the network environment 1500 may communicate with an electronic system 1502 via a first network 1598 (e.g., a short-range wireless communication network), or an electronic system 1504 or a server 1508 via a second network 1599 (e.g., a long-range wireless communication network). According to an embodiment, the electronic system 1501 may communicate with the electronic system 1504 via the server 1508. According to an embodiment, the electronic system 1501 may include a processor 1520 (e.g., processor 460 of FIG. 4), memory 1530 (e.g., memory 450 of FIG. 4), an input device 1550 (e.g., input device 420 of FIG. 4), a sound output device 1555, a display device 1560 (e.g., a plurality of displays 440 of FIG. 4), an audio module 1570, a sensor module 1576 (e.g., sensor module 410 of FIG. 4), an interface 1577, a haptic module 1579, a camera module 1580, a power management module 1588, a battery 1589, a communication module 1590 (e.g., communication module 430 of FIG. 4), a subscriber identification module (SIM) 1596, or an antenna module 1597. In some embodiments, at least one (e.g., the display device 1560 or the camera module 1580) of the components may be omitted from the electronic system 1501, or one or more other components may be added in the electronic system 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic system 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic system 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic system 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic system 1501, from the outside (e.g., a user) of the electronic system 1501. The input device 1550 may include, for example, a microphone, a mouse, or a keyboard.

The sound output device 1555 may output sound signals to the outside of the electronic system 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic system 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic system (e.g., an electronic system 1502) directly (e.g., wiredly) or wirelessly coupled with the electronic system 1501.

The sensor module 1576 may detect an operational state (e.g., power or temperature) of the electronic system 1501 or an environmental state (e.g., a state of a user) external to the electronic system 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic system 1501 to be coupled with the external electronic system (e.g., the electronic system 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic system 1501 may be physically connected with the external electronic system (e.g., the electronic system 1502). According to an embodiment, the connecting terminal 1578 may include, for example, a HDMI connector, a USB connector, a SD card connector, or an audio connector (e.g., a headphone connector), The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic system 1501. According to one embodiment, the power management module 1588 may be implemented as at least part of, for example, a power management integrated circuit (PMIC).

The battery 1589 may supply power to at least one component of the electronic system 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic system 1501 and the external electronic system (e.g., the electronic system 1502, the electronic system 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic system via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic system 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic system) of the electronic system 1501. According to an embodiment, the antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic system via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic system 1501 and the external electronic system 1504 via the server 1508 coupled with the second network 1599. Each of the electronic systems 1502 and 1504 may be a device of a same type as, or a different type, from the electronic system 1501. According to an embodiment, all or some of operations to be executed at the electronic system 1501 may be executed at one or more of the external electronic systems 1502, 1504, or 1508. For example, if the electronic system 1501 should perform a function or a service automatically, or in response to a request from a user or another device, the electronic system 1501, instead of, or in addition to, executing the function or the service, may request the one or more external electronic systems to perform at least part of the function or the service. The one or more external electronic systems receiving the request may perform the at least part of the function or the service requested, or an additional function or an additional service related to the request, and transfer an outcome of the performing to the electronic system 1501. The electronic system 1501 may provide the outcome, with or without further processing of the outcome, as at least part of a reply to the request. To that end, a cloud computing, distributed computing, or client-server computing technology may be used, for example.

The electronic system according to various embodiments may be one of various types of electronic systems. The electronic systems may include, for example, a portable communication device (e.g., a smart phone), a computer device, a portable multimedia device, a portable medical device, a camera, a wearable device, or a home appliance. According to an embodiment of the disclosure, the electronic systems are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic system 1501). For example, a processor (e.g., the processor 1520) of the machine (e.g., the electronic system 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a first communication circuit configured to transmit or receive signals with an external device;
    a second communication circuit configured to transmit or receive signals with electronic components of a vehicle;
    a first display placed corresponding to a driver seat of the vehicle;
    at least one second display placed corresponding to a passenger seat of the vehicle;
    a camera;
    a plurality of door sensors; and a processor operatively connected to the first display, the at least one second display, the first communication circuit, the second communication circuit, the camera, and the plurality of door sensors, wherein the processor is configured to:
receive vehicle information of the vehicle using the second communication circuit,
receive content using the first communication circuit from a user equipment, the received content including at least one of content mirrored from the user equipment,
identify a location of the user equipment communicatively coupled to the processor,
detect an opening of a corresponding door to the driver seat or a non-driver seat through the plurality of door sensors,
identify a sensitivity of a signal received from the user equipment through the first communication circuit,
when the sensitivity is greater than or equal to a first threshold sensitivity corresponding to the driver seat, determine a location of a user as the driver seat,
when the sensitivity is smaller than the first threshold sensitivity corresponding to the driver seat and greater than or equal to a second threshold sensitivity corresponding to the non-driver seat, determine the location of the user as the non-driver seat,
identify a display closer to the location of the user equipment or the user among the first display and the at least one second display,
when the identified display is the first display and the vehicle information indicates that the vehicle is in a driving mode:
determine whether the received content belongs to a video category,
when the received content belongs to the video category, classify the content into a second type,
when the received content does not belong to the video category, classify the content into a first type,
when a number of text is smaller than a specified number, a size of the text is greater than or equal to a specified size, a number of icons is smaller than the specified number, a size of the icons is larger than or equal to the specified size, and a contrast of an image or the text included in the content is greater than or equal to a specified value, classify the content into a first class of the first type,
when the number of the text or the icons is equal to or greater than the specified number, the size of the text or the icons is smaller than the specified size, or the contrast of the image or the text included in the content is lower than the specified value, classify the content into a second class of the first type,
convert the content belonging to the second class of the first type to a specified standard and display on the first display, and display the content belonging to the first class of the first type without converting the content, and
refrain from displaying the received content on the first display based on that the received content is the second type,
when the identified display is the first display and the vehicle information indicates that the vehicle is in a non-driving mode, display the received content on the first display without converting the received content,
when the identified display is the at least one second display and the received content is the second type, display the received content on the at least one second display, and
while displaying the received content on the at least one second display:
recognize a facial expression change of a non-driver passenger on the non-driver seat corresponding to the at least one second display via the camera, and
display the received content on at least part of the first display based on that the non-driver passenger is interested in the received content,
wherein the first type includes text content, driving-related content, or still image content,
wherein the second type includes moving image content, game content, or three dimensional content, and
wherein the converting to the specified standard includes converting the size of the text included in the content to a first specified size, converting the size of the icons included in the content to a second specified size, and adjusting a spacing between the text or the icons included in the content.

2. The electronic device of claim 1, wherein when the converted content is displayed on the first display and the vehicle information indicates that the vehicle is in the non-driving mode, the processor is configured to stop the conversion of the received content and display the received content on the first display.

3. The electronic device of claim 1, wherein:
the vehicle information includes gear mode information, vehicle speed information, and autonomous driving on/off information; and
the processor is further configured to determine that the vehicle is in the driving mode based on:
the gear mode information indicating an R mode or a D mode,
the autonomous driving on/off information indicating an autonomous driving off state, and
the vehicle speed information indicating that a current speed of the vehicle is equal to or greater than a specified speed.

4. The electronic device of claim 1, wherein:
the vehicle information includes gear mode information, vehicle speed information, and autonomous driving on/off information; and
the processor is further configured to determine that the vehicle is in the non-driving mode based on:
the gear mode information indicating a N mode or P mode, and
the autonomous driving on/off information including an autonomous driving on state.

5. The electronic device of claim 1, further comprising at least one sensor, wherein the processor is further configured to:
when displaying the received content on the first display when the vehicle is in the driving mode, determine, using the sensor, whether there is another user equipment corresponding to the at least one second display; and
if the received content is audio content, based on determining that the another user equipment is not in the vehicle, display lyric or image information of the audio content corresponding to the received content on the at least one second display.

6. A method for displaying content by an electronic device, the method comprising:
- receiving content and vehicle information of a vehicle including the electronic device;
- identifying a location of a user equipment;
- detecting an opening of a corresponding door to a driver seat or a non-driver seat through a plurality of door sensors;
- identifying a sensitivity of a signal received from the user equipment through a communication circuit;
- when the sensitivity is greater than or equal to a first threshold sensitivity corresponding to the driver seat, determining a location of a user as the driver seat;
- when the sensitivity is smaller than the first threshold sensitivity corresponding to the driver seat and greater than or equal to a second threshold sensitivity corresponding to the non-driver seat, determining the location of the user as the non-driver seat;
- identifying a display closer to the location of the user equipment or the user among a first display and at least one second display, the first display being placed corresponding to the driver seat of the vehicle, the at least one second display being placed corresponding to a passenger seat of the vehicle;
- when the identified display is the first display and the vehicle information indicates that the vehicle is in a driving mode by:
  - determining whether the received content belongs to a video category,
  - when the received content belongs to the video category, classifying the content into a second type,
  - when the received content does not belong to the video category, classifying the content into a first type,
  - when a number of text is smaller than a specified number, a size of the text is greater than or equal to a specified size, a number of icons is smaller than the specified number, a size of the icons is larger than or equal to the specified size, and a contrast of an image or the text included in the content is greater than or equal to a specified value, classifying the content into a first class of the first type,
  - when the number of the text or the icons is equal to or greater than the specified number, the size of the text or the icons is smaller than the specified size, or the contrast of the image or the text included in the content is lower than the specified value, classifying the content into a second class of the first type,
  - converting the content belonging to the second class of the first type to a specified standard and displaying on the first display, and displaying the content belonging to the first class of the first type without converting the content, and
  - refraining from displaying the received content on the first display based on that the received content is the second type;
- when the identified display is the first display and the vehicle information indicates that the vehicle is in a non-driving mode, displaying the received content on the first display without converting the received content;
- when the identified display is the at least one second display and the received content is the second type, displaying the received content on the at least one second display; and
- while displaying the received content on the at least one second display:
  - recognizing a facial expression change of a non-driver passenger on the non-driver seat corresponding to the at least one second display via a camera, and
  - displaying the received content on at least part of the first display based on that the non-driver passenger is interested in the received content,
- wherein the first type includes text content, driving-related content, or still image content,
- wherein the second type includes moving image content, game content, or three dimensional content, and
- wherein the converting to the specified standard includes converting the size of the text included in the content to a first specified size, converting the size of the icons included in the content to a second specified size, and adjusting a spacing between the text or the icons included in the content.

7. The method of claim 6, further comprising when the converted content is displayed on the first display and the vehicle information indicates that the vehicle is in the non-driving mode, stopping the conversion of the received content and displaying the received content on the first display.

* * * * *